United States Patent
Gilchrist et al.

(10) Patent No.: US 11,167,282 B2
(45) Date of Patent: Nov. 9, 2021

(54) AUTO-PIPETTING APPARATUS AND METHOD

(71) Applicant: HighRes Biosolutions, Inc., Beverly, MA (US)

(72) Inventors: Ulysses Gilchrist, Reading, MA (US); Robert Connors, Beverly, MA (US)

(73) Assignee: HIGHRES BIOSOLUTIONS, INC., Beverly, MA (US)

( * ) Notice: Subject to any disclaimer, the term of this patent is extended or adjusted under 35 U.S.C. 154(b) by 638 days.

(21) Appl. No.: 15/883,843

(22) Filed: Jan. 30, 2018

(65) Prior Publication Data

US 2018/0280967 A1    Oct. 4, 2018

Related U.S. Application Data

(60) Provisional application No. 62/452,572, filed on Jan. 31, 2017.

(51) Int. Cl.
*B01L 3/02* (2006.01)
*G01N 35/10* (2006.01)

(52) U.S. Cl.
CPC .......... *B01L 3/0275* (2013.01); *B01L 3/0227* (2013.01); *B01L 3/0237* (2013.01); *B01L 3/0279* (2013.01); *G01N 35/1074* (2013.01); *B01L 3/021* (2013.01); *B01L 2200/0689* (2013.01); *B01L 2200/141* (2013.01); *B01L 2300/027* (2013.01); *B01L 2400/0487* (2013.01); *G01N 35/1016* (2013.01); *G01N 2035/103* (2013.01)

(58) Field of Classification Search
None
See application file for complete search history.

(56) References Cited

U.S. PATENT DOCUMENTS

| | | |
|---|---|---|
| 5,063,790 A | 11/1991 | Freeman et al. |
| 6,973,845 B2 | 12/2005 | Bell |

(Continued)

FOREIGN PATENT DOCUMENTS

WO    2012012794    1/2012

OTHER PUBLICATIONS

International Search Report, International Application No. PCT/US2018/016247, dated Apr. 30, 2018.

*Primary Examiner* — Matthew D Krcha
*Assistant Examiner* — Brittany I Fisher
(74) *Attorney, Agent, or Firm* — Perman & Green, LLP

(57) ABSTRACT

An auto-pipetting apparatus includes a dispensing head with at least one pipetting tip mandrel having an elongated stud body with an insertion end. The at least one pipetting tip mandrel mates with a pipetting tip. A first adjustable seal, disposed on the elongated stud body, and a second adjustable seal, disposed on the elongated stud body, seal the pipetting tip mated to the at least one pipetting tip mandrel. The first adjustable seal defines a snub surface. The snub surface effects a substantially continuous circumferential contact seal with radially impinging contact between the pipetting tip and the at least one pipetting tip mandrel. The second adjustable seal is adjustable between a disengaged position and an engaged position and effects a releasable grip and another substantially continuous circumferential contact seal between the pipetting tip and the at least one pipetting tip mandrel around the pipetting tip.

22 Claims, 14 Drawing Sheets

(56) References Cited

U.S. PATENT DOCUMENTS

| | | |
|---|---|---|
| 7,033,543 B1 | 4/2006 | Panzer et al. |
| 8,277,757 B2 | 10/2012 | Kelly et al. |
| 8,501,118 B2 | 8/2013 | Mathus et al. |
| 8,512,650 B2 | 8/2013 | Jungheim et al. |
| 2008/0138249 A1 | 6/2008 | Itoh |
| 2010/0196210 A1 | 8/2010 | Jingheim et al. |
| 2011/0268627 A1* | 11/2011 | Warhurst .............. B01L 3/0227 422/511 |
| 2012/0258026 A1 | 10/2012 | Naumann |

* cited by examiner

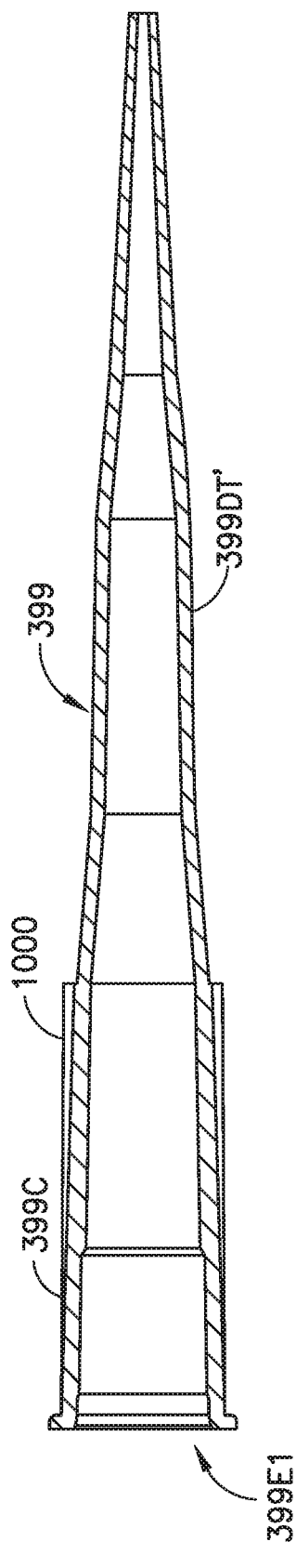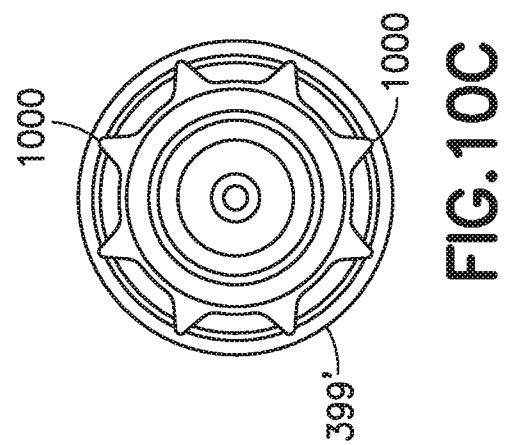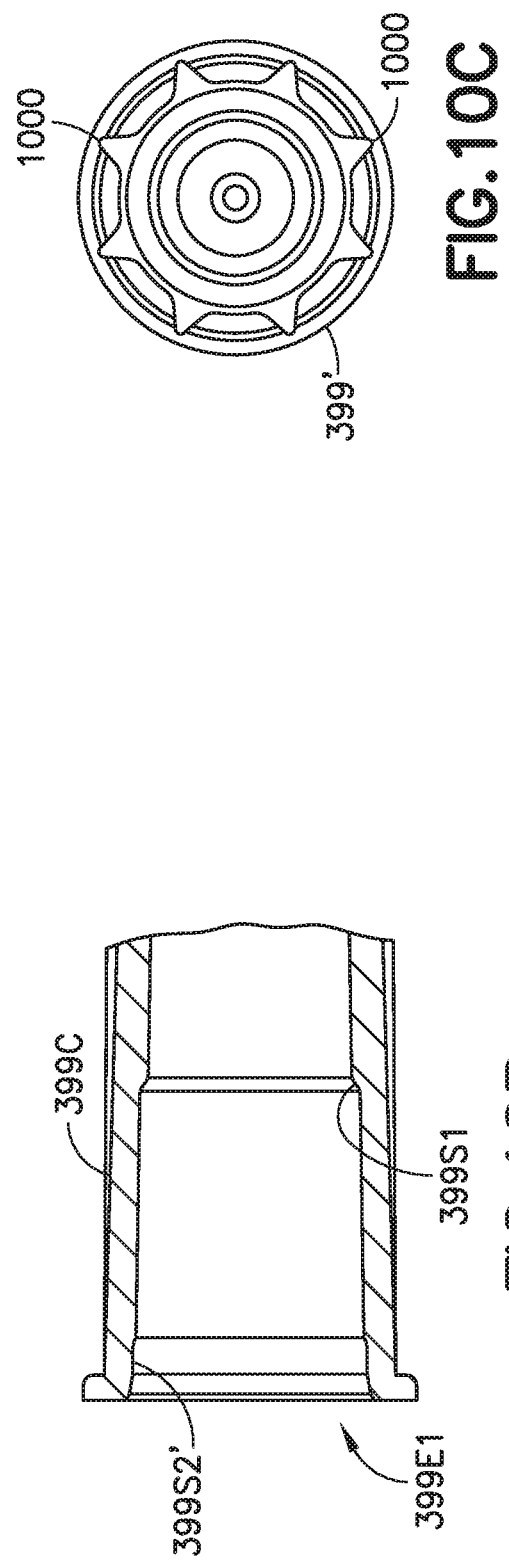
FIG.10A
FIG.10C
FIG.10B

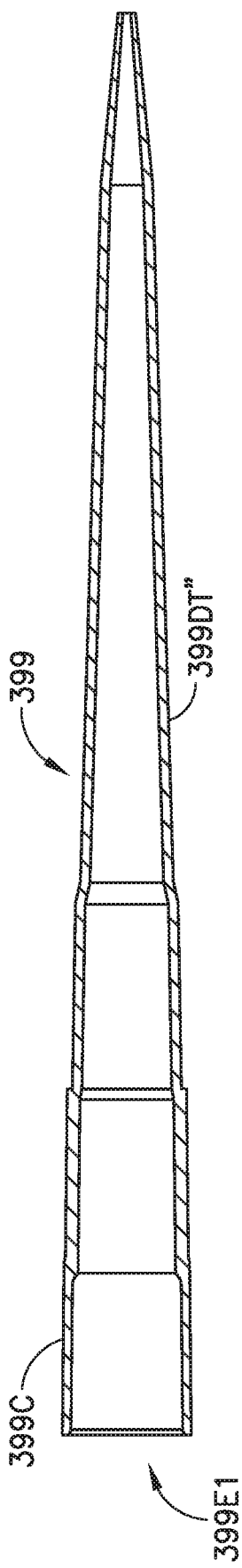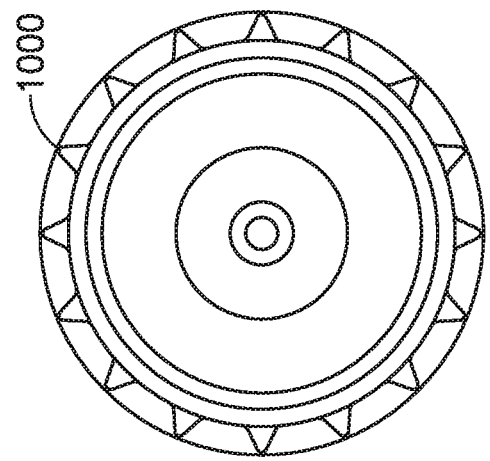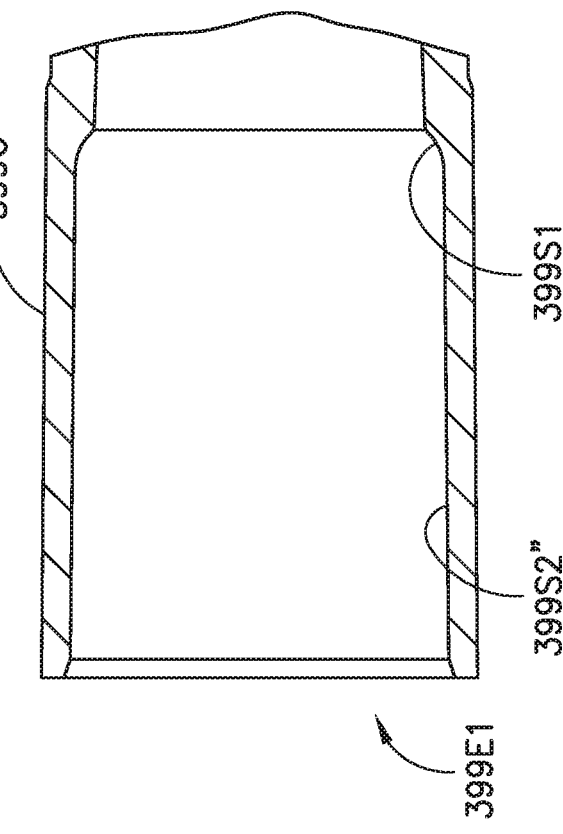

AUTO-PIPETTING APPARATUS AND METHOD

CROSS-REFERENCE TO RELATED APPLICATIONS

This application is a Non-Provisional of and claims the benefit of U.S. Provisional Patent Application No. 62/452,572, filed on Jan. 31, 2017, the disclosure of which is incorporated herein by reference in its entirety.

BACKGROUND

1. Field

The exemplary embodiments generally relate to automated liquid handling and dispensing, more particularly, to apparatus and methods for auto-pipetting.

2. Brief Description of Related Developments

Generally disposable pipette tips, used with automated liquid handling and dispensing systems enable repeated use of such pipetting systems to transfer different fluid samples without cross-contamination of the fluid samples. Disposable pipette tips are generally have a hollow, elongated and generally conical shape. The upper end of the pipette tip typically includes a collar that is mounted to pipetting tip mandrel the automated liquid handling and dispensing system.

Generally the disposable pipette tips are held on the pipetting tip mandrel through a friction coupling generated by a tapered fit between pipetting tip mandrel and the pipette tip collar, as well as sealing rings on the inside circumference of the pipette tip collar, to secure and seal the pipette tips to the mounting shaft. The fit between the pipetting tip mandrel and the disposable tip is achieved by pushing the pipetting tip mandrel into the tapered pipette tip collar until the pipetting tip mandrel is wedged into the pipetting tip. A seal between the pipetting tip and the pipetting tip mandrel is formed between the tip collar and the mounting shaft as a result of crushing the sealing ring and/or stretching the diameter of the collar.

Automated liquid handling and dispensing systems generally have a number of pipetting tip mandrels on a common dispensing head so that a number of samples can be transferred together in a single movement of the dispensing head. Loading the disposable pipetting tips on each of the pipetting tip mandrels generally requires substantial force in order to get all of the pipetting tips to adequately attach to respective pipetting tip mandrels of the common dispensing head. The force required to adequately attach the pipetting tips to the pipetting tip mandrels may directly impact the size and cost of at least some portions of the automated liquid handling and dispensing system as actuators of the automated liquid handling and dispensing system need to be sized to generate enough force to load the pipetting tips onto the pipetting tip mandrels. In addition, the actuators need to have enough capacity to load the pipetting tips onto the pipetting tip mandrels/for example, continually for a long period of time. The structure of the automated liquid handling and dispensing system also needs to have enough stiffness that deformation of the structure does not impact loading of the pipetting tips onto the pipetting tip mandrels.

It would be advantageous to have an automated liquid handling and dispensing system that loads pipetting tips onto respective pipetting tip mandrels with sufficient force while keeping the size and cost of the automated liquid handling and system to a minimum.

BRIEF DESCRIPTION OF THE DRAWINGS

The foregoing aspects and other features of the disclosed embodiment, are explained in the following description, taken in connection with the accompanying drawings, wherein:

FIGS. 10A-10C are schematic illustrations of a pipetting tip in accordance with aspects of the disclosed embodiment; and FIGS. 11A-11C are schematic illustrations of a pipetting tip in accordance with aspects of the disclosed embodiment.

DETAILED DESCRIPTION

Figure 1:
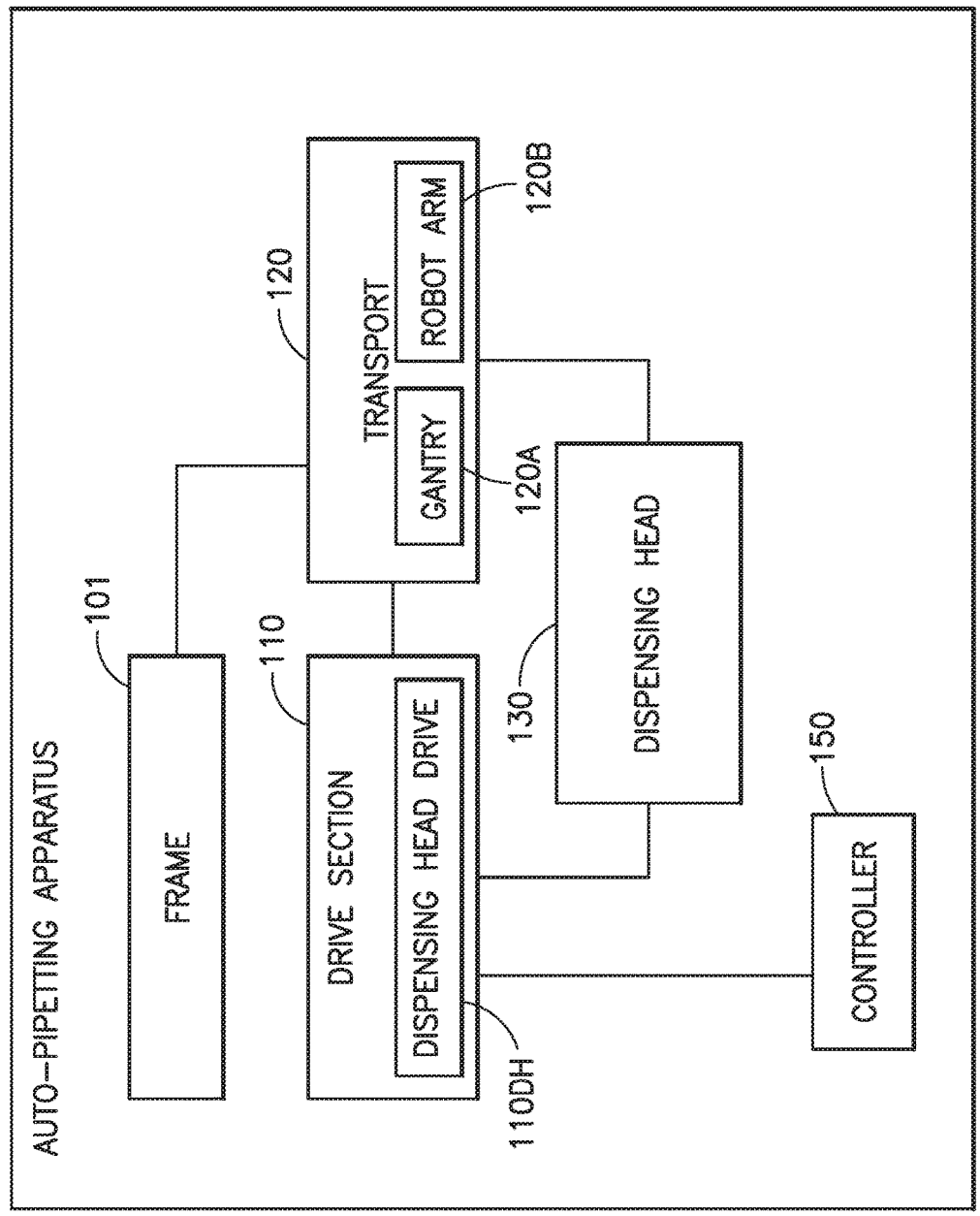
FIG. 1 is a schematic illustration of an auto-pipetting apparatus in accordance with aspects of the disclosed embodiment.
Figure 1A:
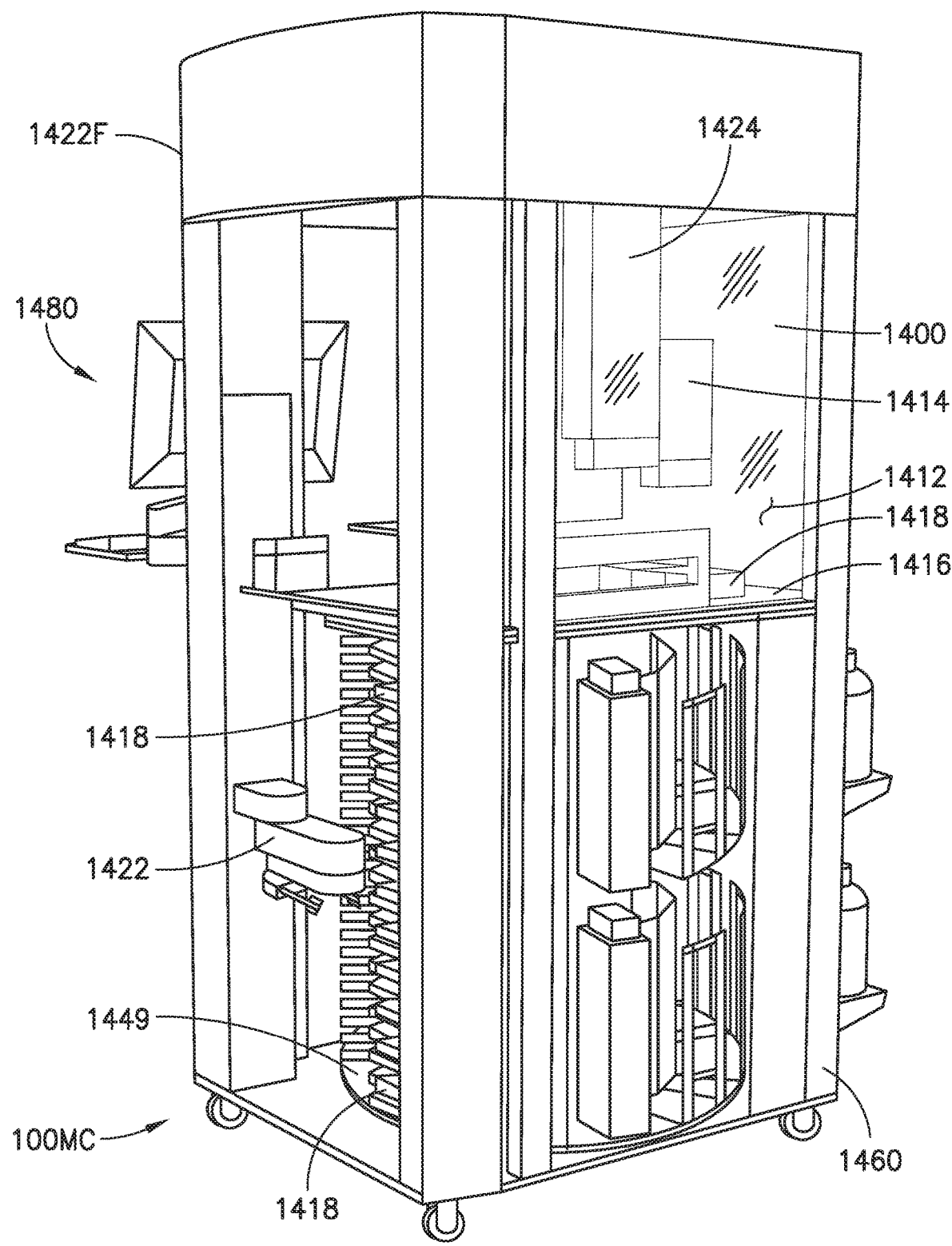
FIG. 1A is a schematic illustration of an auto-pipetting apparatus in accordance with aspects of the disclosed embodiment.

FIGS. 1 and 1A are schematic illustrations of an auto-pipetting apparatus in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used. Further, while the aspects of the disclosed embodiment are described herein with respect to automated liquid handling and dispensing systems, the aspects of the disclosed embodiment are equally applicable to manually operated pipetting apparatus.

Figure 2:
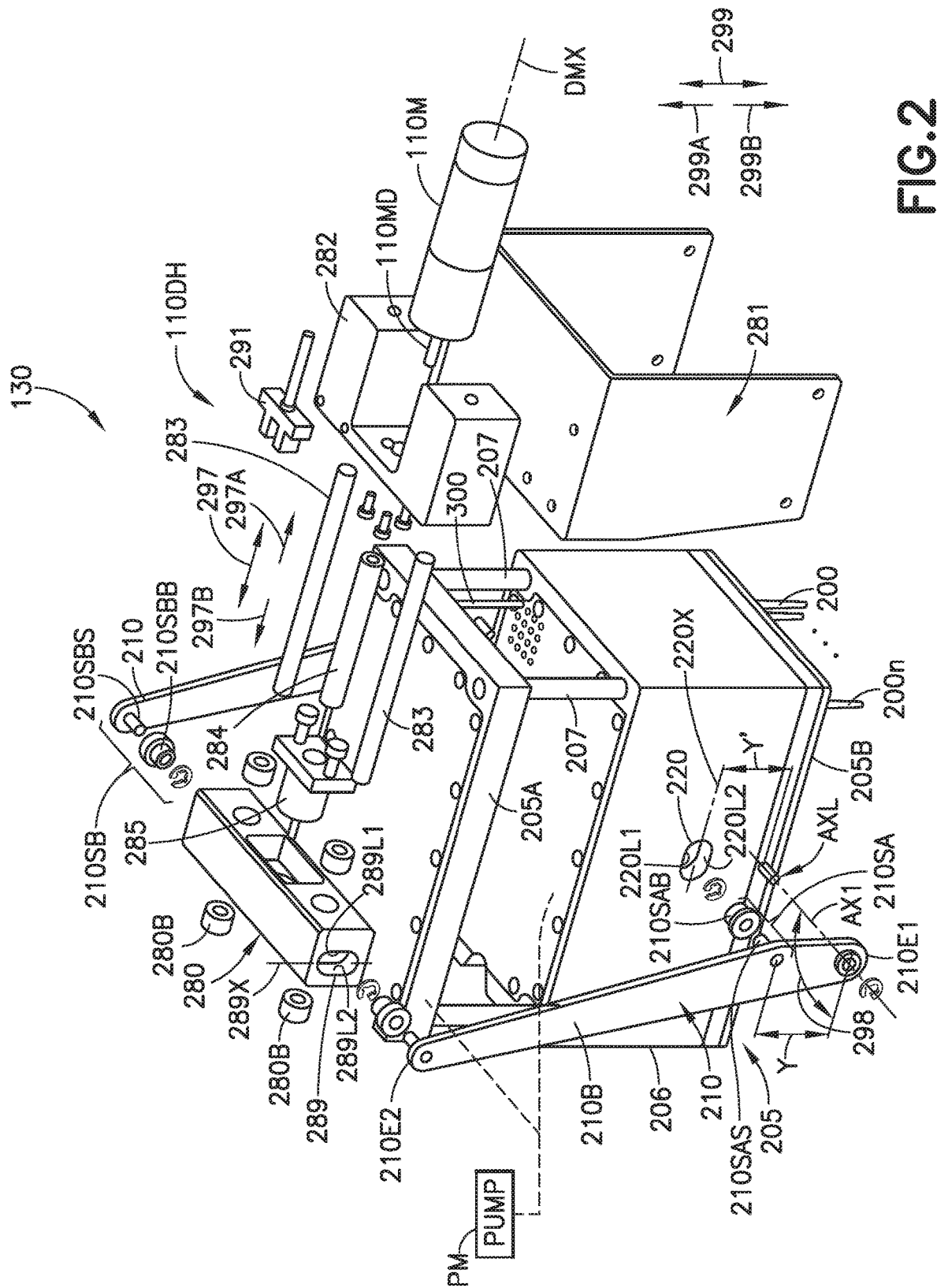
FIG. 2 is a schematic illustration of a portion of the auto-pipetting apparatus in accordance with aspects of the disclosed embodiment.
Figure 3:
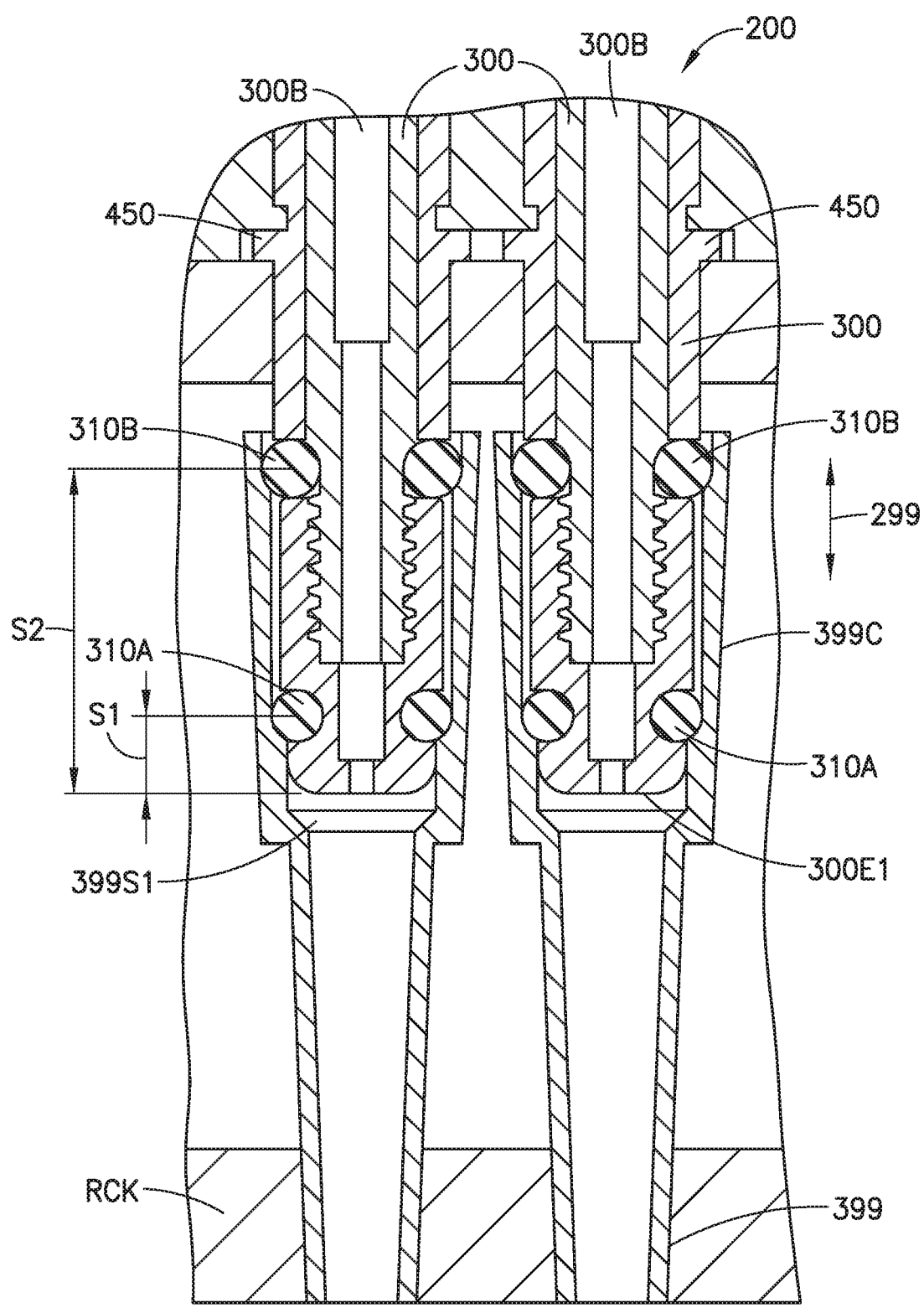
FIG. 3 is a schematic illustration of a portion of the auto-pipetting apparatus in accordance with aspects of the disclosed embodiment.
Figure 4:
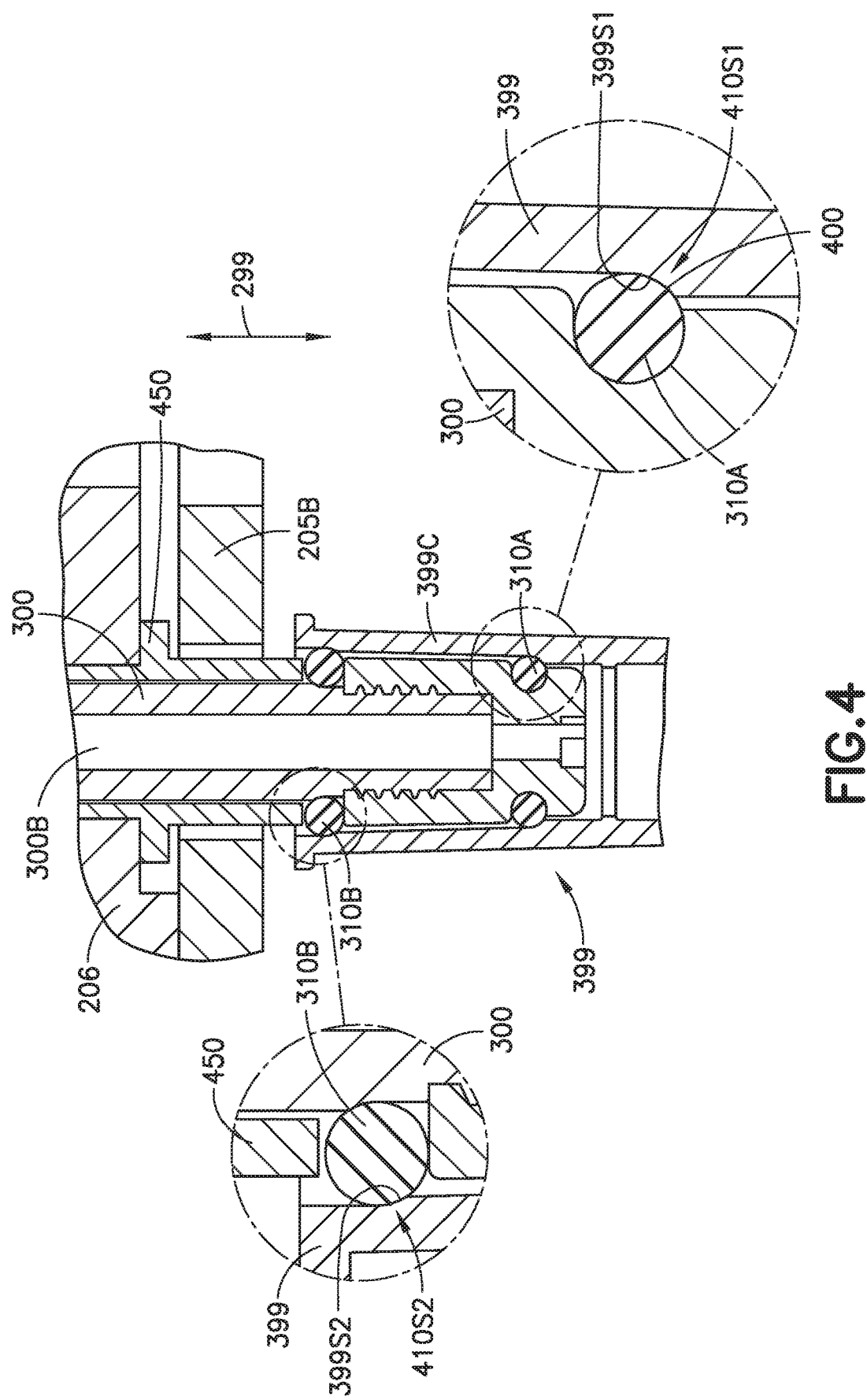
FIG. 4 is a schematic illustration of a portion of the auto-pipetting apparatus in accordance with aspects of the disclosed embodiment.

Referring to FIGS. 1, 1A and 2, the aspects of the disclosed embodiment provide an auto-pipetting apparatus 100 having a dispensing head 130 that applies minimal force to couple and decouple pipetting tips from the dispensing head 130. The auto-pipetting apparatus 100 is configured so as to simultaneously capture/grip and seal each pipette (with a multi-seal engagement to each pipette) to the dispensing head 130 and the simultaneous capturing and sealing is substantially simultaneously effected for all pipettes held in a pipette tip holding tray/rack RCK (FIG. 3) with a common actuation action from a common motor/actuator 110M of the auto-pipetting apparatus 100. In one aspect, the pipette tip holding tray/rack RCK has a standard pipette tip holding capacity such as, for example, 96 pipetting tips or 384 pipetting tips while in other aspects, the pipette tip holding tray/rack RCK may have any suitable pipette tip holding capacity. As will be described in greater detail below, minimal force may be achieved by providing a slight clearance between the pipetting tip and the pipetting tip mandrel 200-200n. The clearance between the pipetting tip and the pipetting tip mandrel 200-200n allows the pipetting tip mandrel 200-200n to slip into the pipetting tip with minimal force. The pipetting tip is pushed against, a first sealing surface of the pipetting tip mandrel 200-200n that sets or defines the position of the pipetting tip relative to the pipetting tip mandrel 200-200n. The pipetting tip is set in a predetermined alignment relative to and retained on the pipetting tip mandrel 200-200n using expandable components/seals disposed on the pipetting tip mandrel 200-200n where the expandable components/seals interface and grip a flat or tapered inside surface of the pipetting tip, Friction between the expandable components/seals and the pipetting tip retain the pipetting tip on the pipetting tip mandrel 200-200n.

As can be seen in FIG. 1, the auto-pipetting apparatus 100 includes a frame 101. Any suitable transport 120 such as, for example, a gantry type transport system 120A, a robot arm 10B or a combination thereof may be connected to the frame 101. The auto-pipetting apparatus 100 also includes a drive section 110 connected to the transport 120. A dispensing head 130 may be mounted to and carried by the transport 120, so as to be connected to the frame 101, where movement of the transport 120, and hence the dispensing head 130, is provided by the drive section 110. Any suitable controller 150 may be connected to the drive section 110 and include any suitable programming and memory for effecting operation of the auto-pipetting apparatus 100 as described herein. In one aspect, the auto-pipetting apparatus 100 may be substantially similar to the mobile cart described in U.S. patent application Ser. No. 14/636,962 filed on Mar. 3, 2015 and published on Sep. 8, 2016 as U.S. pre-grant publication number 2016/0256866, which may in turn be included in a robotic processing system substantially similar to that described in U.S. provisional patent application No. 62/381,400 filed on Aug. 30, 2016 and entitled "Robotic Processing System," the disclosures of which are incorporated herein by reference in their entireties. In other aspects the auto-pipetting apparatus may have any suitable mobile or stationary configuration.

Referring also to FIG. 1A, in one aspect, the auto-pipe pipetting apparatus 100 may include a mobile cart 100MC. The mobile cart 100MC may include a pipetting chamber 1400, a storage chamber 1460 coupled with the pipetting chamber 1400, and a control system 1480 (which may be any suitable control system, such as controller 150, having a processor configured to carry out any suitable operations of the auto-pipetting apparatus 100). While the pipetting chamber 1400 and storage chamber 1460 are shown as being included in a common housing or frame, such as frame 101, in other aspects, the pipetting chamber 1400 may be separated from the storage chamber 1460, such that the pipetting chamber 1400 can act as an independent pipetting chamber. In one aspect, the pipetting chamber 1400 may be accessible through one or more doors 1412, where the pipetting chamber 1400 is sealed from an ambient environment when the one or more doors 1412 are closed. The storage chamber 1460 may also be similarly sealed from the ambient environment by one or more doors 1412.

In one aspect, the pipetting chamber 1400 may include a set of pipettor cartridges 1414, which in one aspect include a dispensing head 130, docked in the pipetting chamber 1400 at any suitable dock location of the pipetting chamber 1400. The pipetting chamber 1400 may also include at least one tray dock 1416 for holding pipetting trays 1418. The pipetting chamber 1400 may include any suitable carrier 1424, which in one aspect is substantially similar to transport 120, that is configured to transport each of the pipettor cartridges 1414 to a pipetting location, e.g. a location of at least one of the pipetting trays 1418 within a tray dock 1416 in the pipetting chamber 1400. In one aspect, the carrier 1424 is a gantry system while in other aspects the carrier may be any suitable transport such as an articulated robotic transport arm. The mobile cart 100MC may also include any suitable robotic transport arm 1422 configured to move pipetting trays 1418 between the pipetting chamber 1400 and a storage carousel 1449 of the storage chamber 1416.

Referring to FIG. 2, the dispensing head 130 includes a frame 205 that has a first member 205A, a second member 205B and one or more guide members 207 (such as guide rods) coupling the first member 205A and the second member 205B together in a predetermined spaced relationship so that the first member 205A and the second member 205B are spaced apart from one another by a predetermined distance. In one aspect, the dispensing head 130 also includes a plate 206 disposed between the first member 205A and the second member 205B where the plate 206 is movably coupled to the frame 205. In one aspect, the plate 206 is movably coupled to the one or more guide members 207 so that one of the frame 205 and the plate 206 is movable relative to the other one of the frame 205 and plate 206 in direction 299. In one aspect, where the frame 205 is fixedly coupled to the transport 120 the plate 206 moves in direction 299 relative to the frame 205 for gripping and releasing pipetting tips as described herein. In another aspect, the plate 206 may be fixedly coupled to the transport 120 so that the frame 205 moves in direction 299 relative to the plate 206 for gripping and releasing pipetting tips as described herein.

Figure 2A:
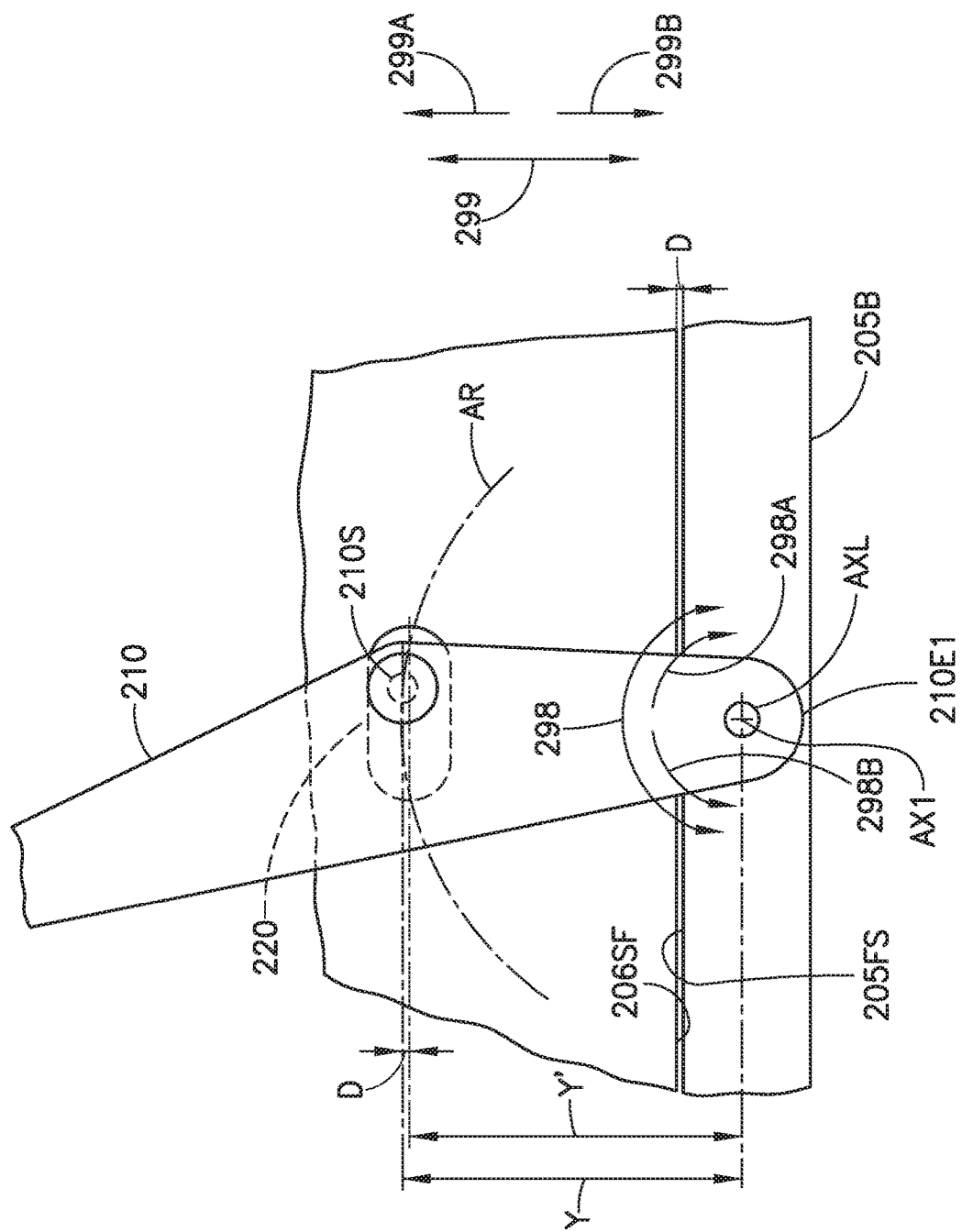
FIG. 2A is a schematic illustration of a portion of the auto-pipetting apparatus in accordance with aspects of the disclosed embodiment.

Referring to FIGS. 2 and 2A, the relative movement or stroke between the frame 205 and the plate 206 may be effected by a pivoting action of one or more connecting levers 210. In one aspect, each of the one or more connecting levers 210 includes a longitudinally extended body 210B having a first end 210E1 and a second end 210E2. The first end 210E1 may be rotatably coupled to the second member 205B of the frame about a respective pivot axle AXL, where the respective pivot axles AXL extend from opposite sides of the second member 205B along a common axis AX1. The second end 210E2 of each of the one or more connecting levers 210 is connected to a drive motor 110M of the drive section 110 as will be described in further detail below.

Each of the one or more connecting levers 210 includes a protruding member 210SA that is disposed between the first end 210E1 and the second end 210E2 of a respective connecting lever 210. In one aspect, the protruding member 210SA includes a stud 210SAS that laterally extends from the respective connecting lever 210 and a bushing 210SAB fit over the stud 210SAS, while in other aspects the protruding member may be a single piece member that is coupled to the respective connecting lever 210 in any suitable manner or formed in unitary construction with the respective connecting lever 210. The protruding member 210SA engages an elongated slot 220 in the plate 206 where a longitudinal axis 220X of the elongated slot 220 is arranged transverse to the direction 299 of relative movement between the frame 205 and the plate 206. In one aspect, the longitudinal axis 220X extends in direction 297. In one aspect, the protruding member 210SA is sized so that, a clearance fit exists between the protruding member 210SA and the elongated slot 220 such that as the one or more connecting levers 210 pivot in direction 298 about the respective pivot axle AXL (e.g. pivots about axis AX1) the protruding member 210SA moves along longitudinal axis 220X within the elongated slot 220 and an interface between the protruding member 210SA and longitudinal sides 220L1, 220L2 of the elongated slot 220 causes relative movement between the plate 206 and the frame 205 in direction 299 where the amount D of relative movement is defined at least in part by a distance along an arc AR through which the protruding member 210SA travels about the pivot axle AX1. For example, the center of the protruding member 210SA of the connecting lever 210 is spaced from the axis AX1 by a distance Y. The center (e.g. longitudinal axis 220X) of the elongated slot 220 may be separated from the axis AX1 by a distance Y' when surface 206SF of the plate 206 is in substantial contact with surface 205SF of the frame 205. Here the amount of relative movement D is the difference between distance Y and distance Y' where as the connecting lever 210 pivots about axis AX1 the protruding member 210SA interfaces with the elongated slot 220 to move the plate 206 in direction 299A an amount equal to the distance D (thereby separating surfaces 206SF, 205SF by the distance D).

In one aspect, the dispensing head 130 includes a dispensing head drive 110DH. The dispensing head drive 110DH includes a drive motor 110M and a shuttle 280. In one aspect, the drive motor 110M is mounted to the plate 206 with a motor mount that includes a bridge member 281, that straddles the frame 205, and a mounting block 282 that is mounted to the bridge member 281, where the drive motor 110M is mounted to the mounting block 282. In other aspects, the drive motor 110M may be mounted to the plate 206 in any suitable manner. Here the bridge member 281 is mounted to the plate 206 so that the drive motor 110M is fixed to the plate 206 for movement relative to the frame 205 in direction 299 as the dispensing head drive 110DH is actuated. For example, where the frame 205 is held stationary by the transport 120 the plate 206 and motor 110M move relative to the frame 205 in direction 299; while in other-aspects, where the plate 206 is held stationary by the transport 120 the frame moves relative to the motor 110M and the plate 206.

One or more guide members 283 are coupled to the mounting block 282 and longitudinally extend in direction 297. The shuttle 280 is movably coupled to the one or more guide members 283 so as to move in direction 297 along the guide members 283. In one aspect, the shuttle 280 includes one or more bushings 280B that effect a sliding movement of the shuttle 280 along the one or more guide members 283.

Still referring to FIGS. 2 and 2A, the drive motor 110M is drivingly coupled to the shuttle 280 with a screw drive transmission that includes a screw 284 and a nut 285. In other aspects, the drive motor 110M may be drivingly coupled to the shuttle 280 through any suitable transmission including, but not limited to, belt drives, chain drives and gear drives. In still other aspects, the drive motor 110M may be a linear actuator where one end of the linear actuator is coupled to the bridge member 281 and the other end of the linear actuator is coupled to the shuttle 280. As shown in FIG. 2, the screw 284 is coupled to a drive member 110MD (such as a drive shaft) of the drive motor 110M in any suitable manner so that the drive member 110MD and the screw 284 rotate in unison about a drive member axis of rotation DMX. The not 285 is mounted to the shuttle 280 in any suitable manner so that the screw 284 engages the nut 285 where rotation of the screw 284 bi-directionally moves the shuttle in direction 297. For example, when the drive motor 110M rotates the screw 284 in a first direction the shuttle moves in direction 297A and when the drive motor 110M rotates the screw in a second direction (opposite the first direction) the shuttle moves in direction 297B.

The shuttle 280 includes elongated slots 289 where a longitudinal axis 289X of each of the elongated slots 289 is arranged along the direction 299 of relative movement between the frame 205 and the plate 206. In one aspect, each of the one or more connecting levers 210 include a protruding member 210SB, which is substantially similar to protruding member 210SA, where the protruding member 210SB includes a stud 210SBS that laterally extends from the respective connecting lever 210 and a bashing 210SBB fit over the stud 210SBS, while in other aspects the protruding member may be a single piece member that is coupled to the respective connecting lever 210 in any suitable manner or formed in unitary construction with the respective connecting lever 210. The protruding member 210SB is disposed adjacent the second end 210E2 of the respective connecting lever 210. The protruding member 210SB is sized so that a clearance fit exists between the protruding member 210SB and the elongated slot 289 such that as the shuttle 280 moves in direction 297 the protruding member 210SB of the one or more connecting levers 210 moves along longitudinal axis 289X within the elongated slot 289 and an interface between the protruding member 210SB and longitudinal sides 289L1, 289L2 of the elongated slot 289 causes the pivoting movement of the respective connecting lever 210 about axle AXL (e.g. axis AX1) to effect the relative movement between the plate 206 and the frame 205 in direction 299. As may be realized, movement of the protruding member 210SB along longitudinal axis 289X within the elongated slot 289 allows for movement of the drive motor 110M (as well as the screw 284, guide members 283, nut 285 and shuttle 280) and plate 206 in direction 299 relative to the frame 205. The actuation of the plate 206 or frame 205 in direction 299, relative to the other one of the plate 206 or frame 205, with the one or more connecting levers 210 and screw drive (e.g. screw 284 and nut 285) amplifies the force provided by the drive motor 110M (e.g. to provide forces into the hundreds of pounds) for compressing/expanding one or more of the first adjustable sealing member 210A and the second adjustable sealing member 210B to couple the pipetting tips 399 to the one or more pipetting tip mandrels 200-200n while using a low power actuator-having a small size.

As described above, movement of the shuttle 280 in direction 297A causes pivoting of the one or more connecting levers 210 about axis AX1 in direction 298A so that one of the plate 206 and frame 205 moves in direction 299A relative to the other one of the plate 206 and frame 205.

Likewise, movement of the shuttle 280 in direction 297B causes pivoting of the one or more connecting lever 210 about axis AX1 in direction 298B so that one of the plate 206 and frame 205 moves in direction 299B relative to the other one of the plate 206 and frame 205. As such, one of the plate 206 and frame 205 reciprocates relative to the other one of the plate 206 and frame 205 where an amount of the reciprocating movement corresponds to the distance D. Any suitable sensors 291 may be operatively connected to the shuttle 280, the drive motor 110M, the one or more connecting levers 210, the plate 206 and/or the frame 205 for sending position signals to a controller 150 of the auto-pipetting apparatus 100 for determining, for example a position of the shuttle 280, the drive motor 110M, the one or more connecting levers 210 and/or the plate relative to, for example, the frame 205 for effecting gripping and releasing pipetting tips with the dispensing head 130 as described herein.

Referring to FIGS. 2, 3, 4, 5A and 5B the dispensing head includes one or more (e.g. at least one) pipetting tip mandrels 200-200n disposed thereon. In one aspect, each pipetting tip mandrel 200-200n includes an elongated stud body 300 having an insertion end 300E1, where the insertion end 300E1 effects the dispensation of fluid collected by the pipetting tip 399 such that the insertion end 300E1 may also be referred to as a dispensing end. The one or more pipetting tip mandrels 200-200n are each configured for mating with any suitable pipetting tip 399 (e.g. such as a disposable pipetting tip). Referring also to FIGS. 9-11C, as an example, the pipetting tip 399 includes a substantially cylindrical pipette tip collar 399C (which may or may not be tapered or flared). The pipette tip collar 399C has an insertion end 399E1 configured to interface with and automatically engage a pipetting tip mandrel 200-200n of the auto-pipetting apparatus 100, The pipetting tip 399 also includes a dispensing tip 399DT extending from the pipette tip collar 399C opposite the insertion end. The pipette tip collar 399C and/or dispensing tip 399DT may have any suitable outer and/or inner profile to facilitate a predetermined fluid flow through the pipetting tip 399. In one aspect, the pipetting tip 399 may include one or more stiffening features, such as ribs 1000, extending both radially outward and longitudinally along one or more of the pipette tip collar 399C and the dispensing tip 399DT, Suitable examples of dispensing tip configurations that may be incorporated into pipetting tips 399 are available from Labcon® of Petaluma, Calif.

In one aspect, the insertion end 300E1 of the elongated stud body 300 is configured for insertion into the insertion end 399E1 of the substantially cylindrical collar 399C of the pipetting tip 399, e.g., the elongated stud body 300 of the pipetting tip mandrel 200 is inserted into the pipetting tip 399 insertion end 300E1 first. In one aspect, the elongated stud body 300 is coupled to the frame 205 where the plate 206 moves relative to the elongated stud body 300. In one aspect, the elongated stud body 300 of the one or more pipetting tip mandrels 200-200n extends through a respective aperture in the plate 206 where a second end (opposite the insertion end 300E1) of the elongated stud body 300 is coupled to the first member 205A of the frame 205 (where a bore 300B of the elongated stud body 300 may be coupled to any suitable pump PM for evacuating or inserting air/gas into the bore 300B for suctioning fluid into or dispensing fluid from a pipetting tip 399 coupled to the respective pipetting tip mandrel 200-200n). In other aspects, the elongated stud body 300 may be coupled to the plate 206, such as where the frame 205 moves relative to the plate 206 and the plate 206 provides a connection between the bore 300B of the elongated stud body 300 and the pump PM for evacuating or inserting air/gas into the bore 300B for suctioning fluid into or dispensing fluid from a pipetting tip 399 coupled to the respective pipetting tip mandrel 200-200n.

A seal pair of adjustable seals is mounted to each pipetting tip mandrel. The seal pair of adjustable seals includes a first adjustable seal 310A and a second adjustable seal 310B. The first adjustable seal 310A is disposed on the elongated stud body 300 proximally to the insertion end 300E1 so that the first adjustable seal 310A seals the pipetting tip 399 mated to a respective one of the one or more pipetting tip mandrels 200-200n. The second adjustable seal 310B is disposed on the elongated stud body 300 distally to the insertion end 300E1 so that the second adjustable seal 310B seals the pipetting tip 399 mated to the respective one of the one or more pipetting tip mandrels 200-200n. As such, the first adjustable seal 310A is separated from the second adjustable seal 310B at different lengths S1, S2 of the elongated stud body 300 from the insertion end 300E1.

Figure 5B:
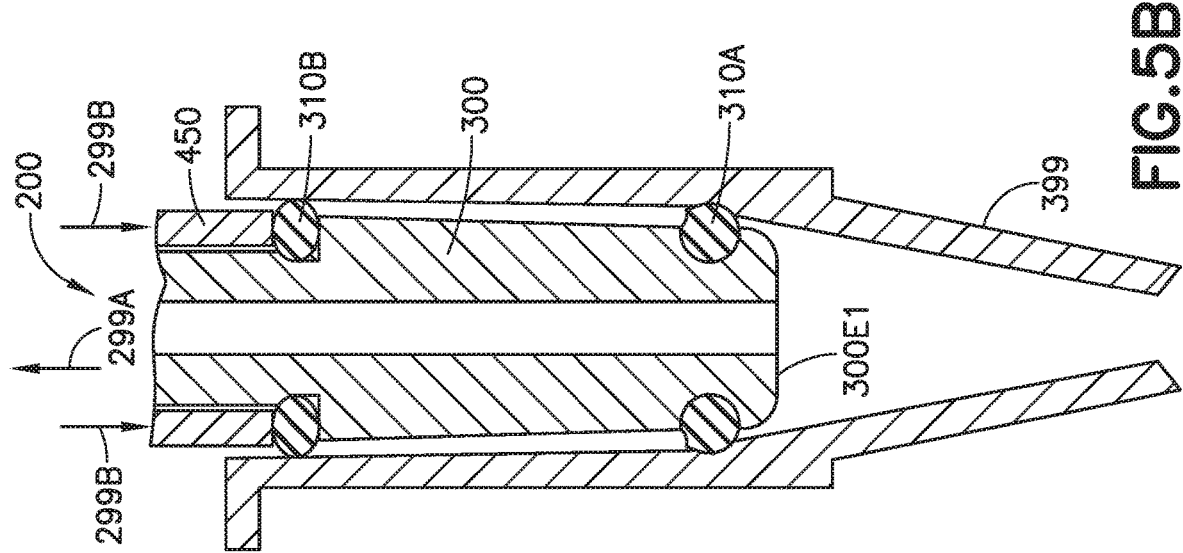
FIGS. 5A and 5B are schematic illustrations of an interfacing between a portion of the auto-pipetting apparatus and a disposable pipetting tip in accordance with aspects of the disclosed embodiment.
Figure 5A:
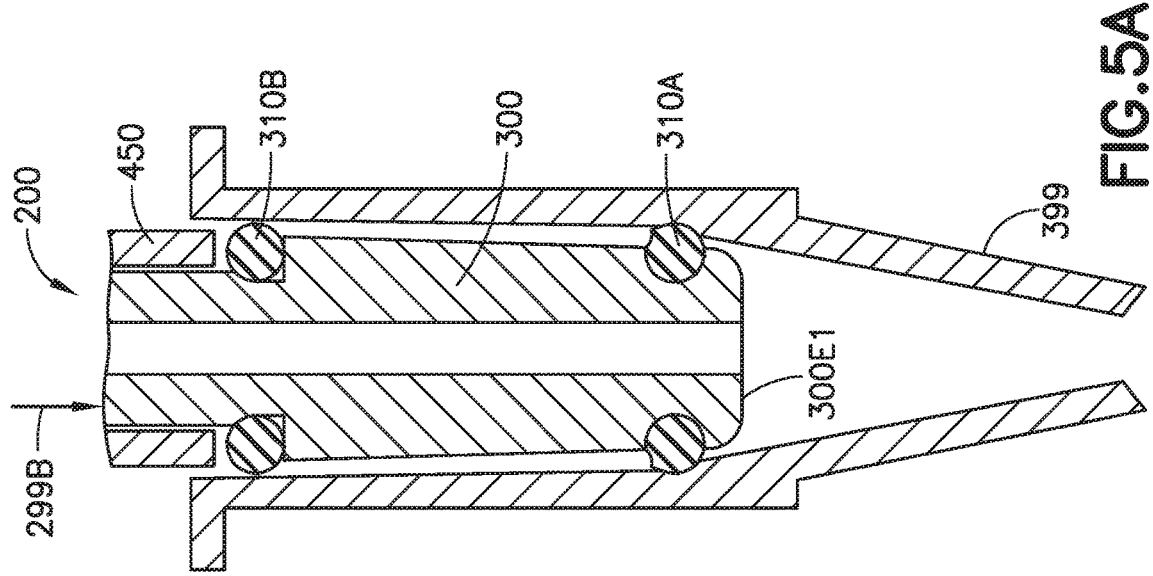
Figure 5C:
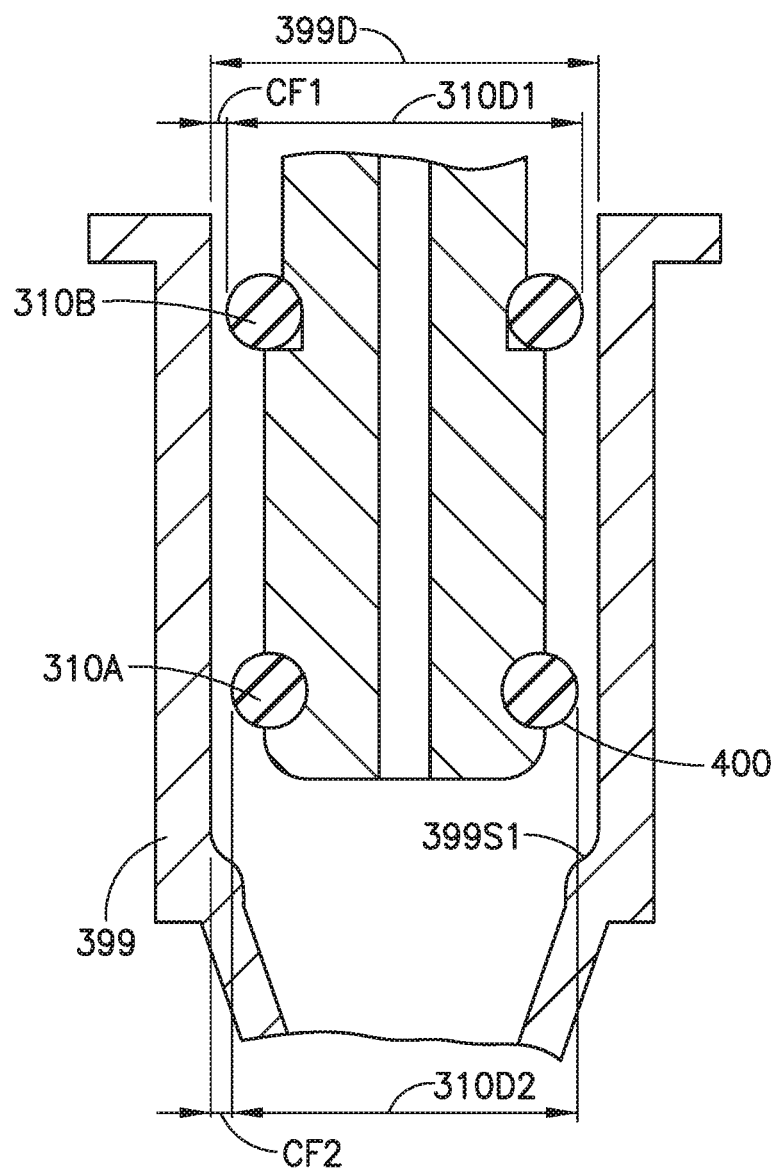
FIG. 5C is a schematic illustration of an interfacing between a portion of the auto-pipetting apparatus and a disposable pipetting tip in accordance with aspects of the disclosed embodiment.

In one aspect, referring also to FIG. 5C, the first-adjustable seal 310A forms a clearance fit CF2 with the pipetting tip 399 as the respective pipetting tip mandrel 200-200n is inserted into the pipetting tip 399. In one aspect, the dispensing head 130 is a 96 pipetting tip dispensing head with the clearance fit CF2 having a gap ratio of about 1.02 to about 1 (e.g. the inner diameter 399D of the pipetting tip 399 is about 1.02 times larger than the outer diameter 310D2 of the first adjustable seal 310A). In another aspect, the dispensing head 130 is a 384 pipetting tip dispensing head with the clearance fit CF2 having a gap ratio of about 1.11 to about 1 (e.g. the inner diameter 399D of the pipetting tip 399 is about 1.11 times larger than the outer diameter 310D2 of the first adjustable seal 310A. In one aspect, the first adjustable seal 310A defines a snub surface 400 of a respective pipetting tip mandrel 200-200n that snubs the pipetting tip mandrel 200-200n insertion into the pipetting tip 399 on contact between the pipetting tip 399 and the snub surface 400 of the first adjustable seal 310A.

Figure 9:
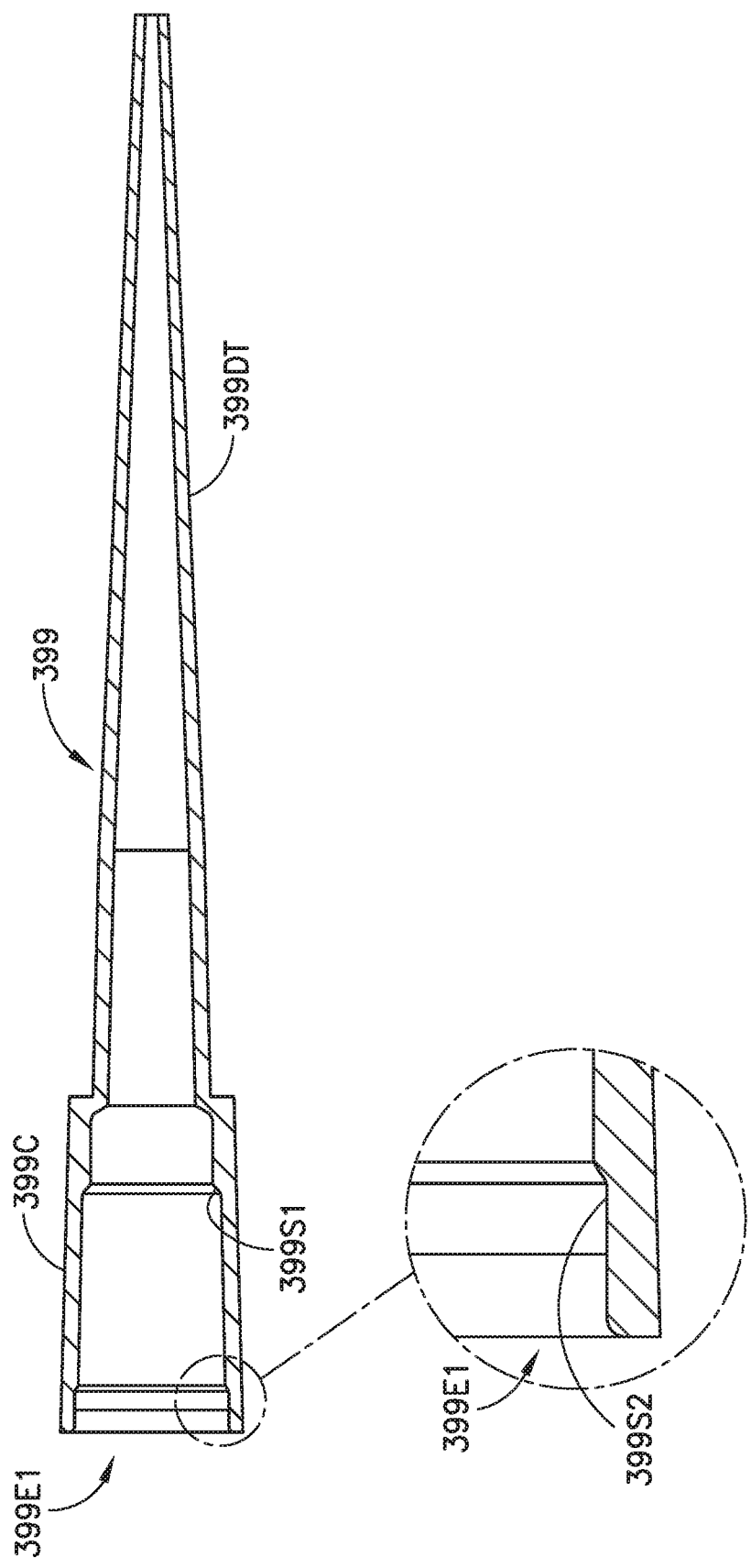
FIG. 9 is a schematic illustration of a pipetting tip in accordance with aspects of the disclosed embodiment.

Referring also to FIGS. 9, 10A-10C and 11A-11C, here the pipetting tip 399 includes a lower or first sealing surface 399S1 (also referred to as a seal detent surface) that interfaces with the first adjustable seal 310A. In one aspect, the lower sealing surface 399S1 has a rounded surface while in other aspects, the lower sealing surface 399S1 may have a flat or angled surface. The lower sealing surface is disposed on a surface (such as an interior surface) of the pipette tip collar 399C. The lower sealing surface 399S1 is disposed so as to engage and snub insertion of the pipetting tip mandrel 200-200n so that snub contact between the lower sealing surface 399S1 wedges the first adjustable seal 310A of the pipetting tip mandrel 200-200n against the lower sealing surface 399S1 effecting a substantially continuous circumferential contact seal with radially impinging contact between the lower sealing surface 399S1 and the pipetting tip mandrel 200-200n as will be described in greater detail below. The pipetting tip 399 also includes an upper or second sealing surface 399S2 (also referred to as a seal detent surface) that interfaces with the second adjustable seal 310B. In one aspect the upper sealing surface 399S2 may be a substantially flat sealing surface 399S2' as best illustrated in FIG. 11B, while in other aspects the upper sealing surface 399S 2 may be a rounded sealing surface 399S2' as best illustrated in FIG. 10B, a combination rounded and flat sealing surface 399S2 as best illustrated in FIG. 9, or an angled surface. The upper sealing surface is disposed on the surface (such as the inner surface) of the pipette tip collar 399C so that the upper sealing surface 399S2 is longitudinally spaced from the lower sealing surface 399S1. The upper sealing surface 399S2 is configured to conform with and engage the second adjustable seal 310B of the pipetting tip mandrel 200-200n effecting a releasable grip and another substantially continuous circumferential contact seal between upper sealing surface 399S2 and the pipetting tip mandrel 200-200n as described in greater detail below.

The snub surface 400 of the first adjustable seal 310A is configured so that the snubbing contact between the snub surface 400 and lower sealing surface 399S1 of the pipetting tip 399, when the pipetting tip mandrel 200-200n is inserted into the pipetting tip 399 in direction 299B, adjusts the first-adjustable seal 310A (e.g. such as by deformation or displacement of the first adjustable seal 310A) to close the clearance fit CF2 between the pipetting tip 399 and the first-adjustable seal 310A and wedges the first adjustable seal 310A against the pipetting tip 399 effecting a substantially continuous circumferential contact seal 410S1 with radially impinging contact between the pipetting tip and the respective pipetting tip mandrel 200-200n.

In one aspect, the second adjustable seal 310B is adjustable between a disengaged position (see FIG. 5A) and an engaged position (see FIG. 5B). The disengaged position provides a clearance fit CF1 (which may be the same or different than clearance fit CF2) with the pipetting tip 399, as the respective pipetting tip mandrel 200-200n is inserted into the pipetting tip 399. The engaged position is such that the second adjustable seal 310B contacts the pipetting tip 399 mated to the respective pipetting tip mandrel 200-200n effecting a releasable grip and another substantially continuous circumferential contact seal 410S2, substantially similar to substantially continuous circumferential contact seal 410S1, between the pipetting tip 399 and the respective pipetting tip mandrel 200-200n around the pipetting tip 399. In one aspect, the dispensing head 130 is a 96 pipetting tip dispensing head with the clearance fit CF1 having a gap ratio of about 1.02 to about 1 (e.g. the inner diameter 399D of the pipetting tip 399 is about 1.02 times larger than the outer diameter 310D1 of the second adjustable seal 310B, where the outer diameter 310D1 may be the same or different than outer diameter 310D2 of the first adjustable seal 310A, such as when the inner surface of the pipetting tip 399 is tapered). In another aspect, the dispensing head 130 is a 384 pipetting tip dispensing head with the clearance fit CF1 having a gap ratio of about 1.11 to about 1 (e.g. the inner diameter 399D of the pipetting tip 399 is about 1.11 times larger than the outer diameter 310D1 of the second adjustable seal 310B).

Still referring to FIGS. 2, 3, 4, 5A and 5B, the dispensing head 130 includes one or more (e.g. at least one) seal adjustment members 450 such that each seal adjustment member 450 forms a sleeve around a respective elongated stud body 300 so as to be movably coupled to the respective elongated stud body 300, of the pipetting tip mandrel 200-200n, for movement in direction 29 relative to the respective elongated stud body 300. In one aspect, the one or more seal adjustment-members 450 may be coupled to the plate 206 so that the plate 206 is common to the one or more seal adjustment members 450 and so that the one or more seal adjustment members 450 are operably connected to the drive motor 110M of the dispensing head drive 110DH (of the drive section 110) by the screw drive (e.g. screw 284 and nut 285 that are common to each of the seal adjustment members 450) through the one or more connecting levers 210. Here movement of the plate 206 in direction 299B, relative to the frame 205, by the drive motor 110M causes corresponding movement of the one or more seal adjustment members 450 (e.g. the one or more seal adjustment members 450 and the plate 206 move in unison) in direction 299B (see FIGS. 5A and 5B) so that the one or more seal adjustment members 450 contact a respective one of the second adjustable seals 310B so as to compress/expand the second adjustable seal 310B and effect adjustment of the second adjustable seal 310B to the engaged positon (e.g. closing the clearance fit CF1 to form the substantially continuous circumferential contact seal 410S2 and grip the pipetting tip 399 for retention on the respective pipetting tip mandrel 200-200n). Likewise, movement of the plate 206 in direction 299A by the drive motor 110M causes corresponding movement of the one or more seal adjustment members 450 in direction 299A (see FIGS. 5A and 5B) so that the one or more seal adjustment members 450 disengages the respective one of the second adjustable seals 310B so as to decompress/retract the second adjustable seal 310B and effects adjustment of the second adjustable seal 310B to the disengaged positon (e.g. opening the clearance fit CF to release the substantially continuous circumferential contact seal 410S2 and release the pipetting tip 399 for removal from the respective pipetting tip mandrel 200-200n). In one aspect, the first adjustable seal 310A and the second adjustable seal 310B may be o-rings having substantially the same durometer while in other aspects the durometers of the first adjustable seal 310A and the second adjustable seal 310B may be different.

In another aspect, the one or more seal adjustment members 450 may be coupled to the frame 205 so that the frame 205 is common to the one or more seal adjustment members 450 and so that the one or more seal adjustment members 450 are operably connected to the drive motor 110M of the dispensing head drive 110DH (of the drive section 110) by the screw drive (e.g. screw 284 and nut 285 that are common to each of the seal adjustment members 450) through the one or more connecting levers 210. Here movement of the frame 205 in direction 299B, relative to the plate 206, by the drive motor 110M causes corresponding movement of the one or more seal adjustment members 450 (e.g. the one or more seal adjustment members 450 and the frame 205 move in unison) in direction 299B (see FIGS. 5A and 5B) so that the one or more seal adjustment members 450 contact a respective one of the second adjustable seals 310B so as to compress/expand the second adjustable seal 310B and effect adjustment of the second adjustable seal 310B to the engaged positon (e.g. closing the clearance fit CF1 to form the substantially continuous circumferential contact seal 410S2 and grip the pipetting tip 399 for retention on the respective pipetting tip mandrel 200-200n). Likewise, movement of the frame 205 in direction 299A by the drive motor 110M causes corresponding movement of the one or more seal adjustment members 450 in direction 299A (see FIGS. 5A and 5B) so that the one or more seal adjustment members 450 disengages the respective one of the second adjustable seals 310B so as to decompress/retract the second adjustable seal 310B and effects adjustment of the second adjustable seal 310B to the disengaged positon (e.g. opening the clearance fit CF to release the substantially continuous circumferential contact seal 410S2 and release the pipetting tip 399 for removal from the respective pipetting tip mandrel 200-200n).

Figure 7:
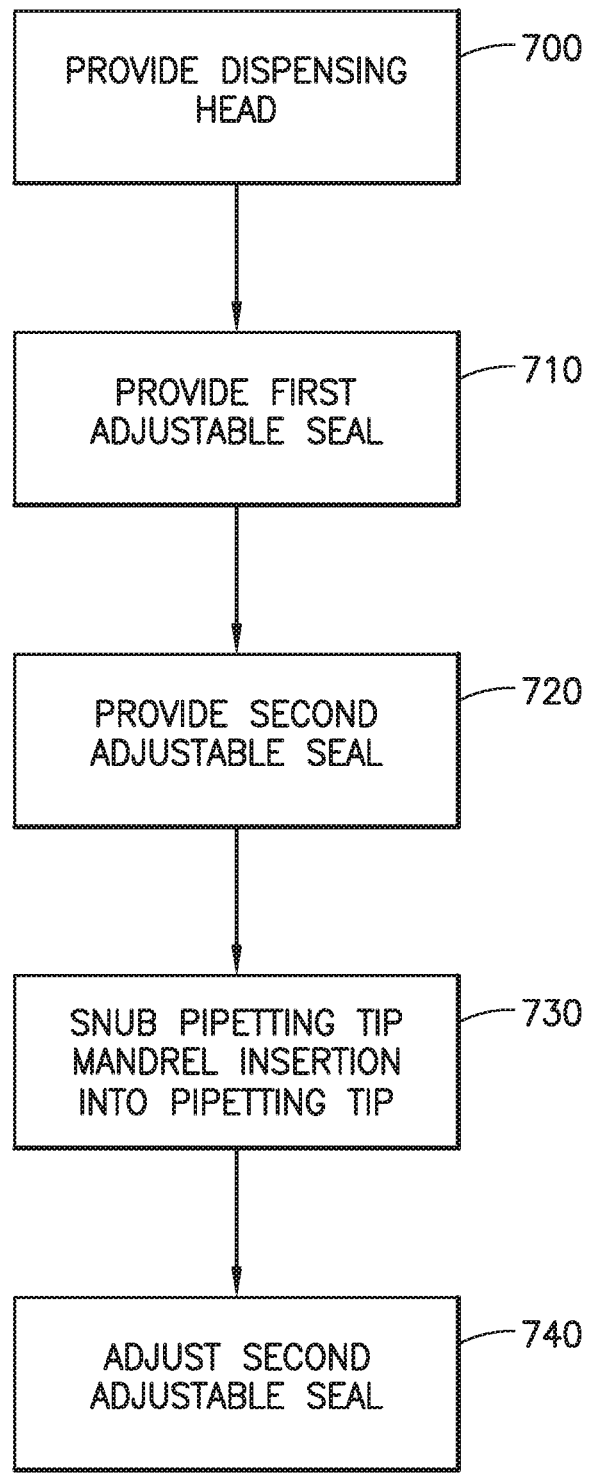
FIG. 7 is a flow diagram in accordance with aspects of the disclosed embodiment.

Referring to FIGS. 2, 2A, 4, 5A, 5B and 7, an exemplary operation of the auto-pipetting apparatus 100 will be described. As described above, the dispensing head 130 is provided (FIG. 7, Block 700) and includes the one or more pipetting tip mandrels 200-200n each having the elongated stud body 300 with the insertion end 300E1. The first adjustable seal 310A is provided (FIG. 7, Block 710) and the second adjustable seal 310B is provided (FIG. 7, Block 720). The one or more pipetting tip mandrels 200-200$n$ are inserted into the respective pipetting tips 399 where the insertion of the one or more pipetting tip mandrels 200-200$n$ is snubbed (FIG. 7, Block 730) on contact between the pipetting tip 399 and the snub surface 400 of the first adjustable seal 310A, where, as described above, the snubbing contact adjusts the first-adjustable seal 310A and wedges the first adjustable seal 310A against the pipetting tip 399 effecting the substantially continuous circumferential contact seal 410S1. In one aspect, the one or more pipetting tip mandrels 200-200$n$ are inserted into the respective pipetting tips 399 through motion of the transport 120 (FIG. 1) which may align the one or more pipetting tips mandrels 200-200$n$ with the respective pipetting tip 399 and then move the dispensing head 130 in direction 299B to insert the one or more pipetting tips mandrels 200-200$n$ into the respective pipetting tip 399. In another aspect, the one or more pipetting tip mandrels 200-200$n$ are inserted into the respective pipetting tips 399 through motion of the pipetting tips 399 such as where the pipetting tips 399 are arranged in a tray and the tray is moved with any suitable transport (which may be substantially similar to transport 120). Movement of the pipetting tips 399 may align pipetting tips 399 with the one or more pipetting tips mandrels 200-200$n$ and where one or the pipetting tips 399 and the dispensing head 130 are moved relative to the other one of the pipetting tips 399 and dispensing head 130 in direction 299B to insert the one or more pipetting tips mandrels 200-200$n$ into the respective pipetting tip 399

The second adjustable seal 310B is adjusted between the disengaged position providing the clearance fit CF1 between the respective pipetting tip mandrel 200-200$n$ and the pipetting tip 399, and the engaged position in which the second adjustable seal 310B contacts the pipetting tip 399 mated to the respective pipetting tip mandrel 200-200$n$ effecting the releasable grip and another substantially continuous circumferential contact seal 410S2 between the pipetting tip 399 and the respective pipetting tip mandrel 200-200$n$ around the pipetting tip. Here the substantially continuous circumferential contact seal 410S2 between the pipetting tip 399 and the second adjustable seal 310B is effected with but one actuation motion, e.g. of the dispensing head drive 110DH, that is substantially common for each pipetting tip mandrel 200-200$n$ of the one or more pipetting tip mandrels 200-200$n$. For example, each of the one or more seal adjustment members 450 are operably coupled to a common drive member (e.g. such as the plate 206, screw 284, shuttle 280 and/or connecting levers 210 of the dispensing head drive 110DH) with another seal adjustment member 450 of the one or more seal adjustment members 450 so that each of the one or more seal adjustment members 450 and the other seal adjustment member 450 are actuated, for movement in direction 299, in unison with a common actuation of the common drive member (e.g. such as the movement, of plate 206 in direction 299, the rotation of screw 284 to drive the shuttle 280, the movement of shuttle 280 in direction 297 and/or pivoting of the connecting levers 210 in direction 298).

The pipetting tip 399 is released from the respective pipetting tip mandrel 200-200$n$ in substantially a reverse manner to that described above.

Referring now to FIGS. 2, 2A, 6A and 6B, in one aspect, one or more seal pair adjustment members 450A (which may be substantially similar to seal adjustment member 450 described above, unless otherwise noted) includes a first portion 450A1 and a second portion 450A2 so that each of the one or more seal pair adjustment members 450A commonly engages the first adjustable seal 310A and the second adjustable seal 310B, of the seal pair. For example, the first adjustable seal 310A and the second adjustable seal 310B are disposed on the respective pipetting tip mandrel 200-200$n$ as described above so that the first adjustable seal 310A and the second adjustable seal 310B are spaced apart from one another. The second portion 450A2 of the one or more seal pair adjustment members 450A may be movably coupled to the respective elongated stud body 300 of a respective pipetting tip mandrel 200-200$n$ so as to form a sleeve that is movable relative to the elongated stud body 300 in direction 299 in a manner substantially similar to that-described above with respect to seal adjustment member 450. The second portion 450A2 is disposed between the first adjustable seal 310A and the second adjustable seal 310B proximate the insertion end 300E1 of the elongated stud body 300. The first portion 450A1 of the one or more seal pair adjustment members 450A may also be movably coupled to the respective elongated stud body 300 of a respective pipetting tip mandrel 200-200$n$ so as to form a sleeve that is movable relative to the elongated stud body 300 in direction 299 in a manner substantially similar to that described above with respect to seal adjustment member 450. The first portion 450A1 is positioned distal to the insertion end 300E1 of the elongated stud body 300, opposite the second portion 450A2 relative to the second adjustable seal 210B.

In one aspect, the first portion 450A1 and the second portion 450A2 are separate and distinct from each other so that each of the first portion 450A1 and the second portion 450A2 are independently movable along the elongated stud body 300. In another aspect, one of the first portion 450A1 and the second portion 450A2 may be slidingly engaged with the other one of the first portion 450A1 and the second portion 450A2 such that the first portion 450A1 and the second portion 450A2 are coupled to each other while still being movable relative to each other.

Figure 6B:
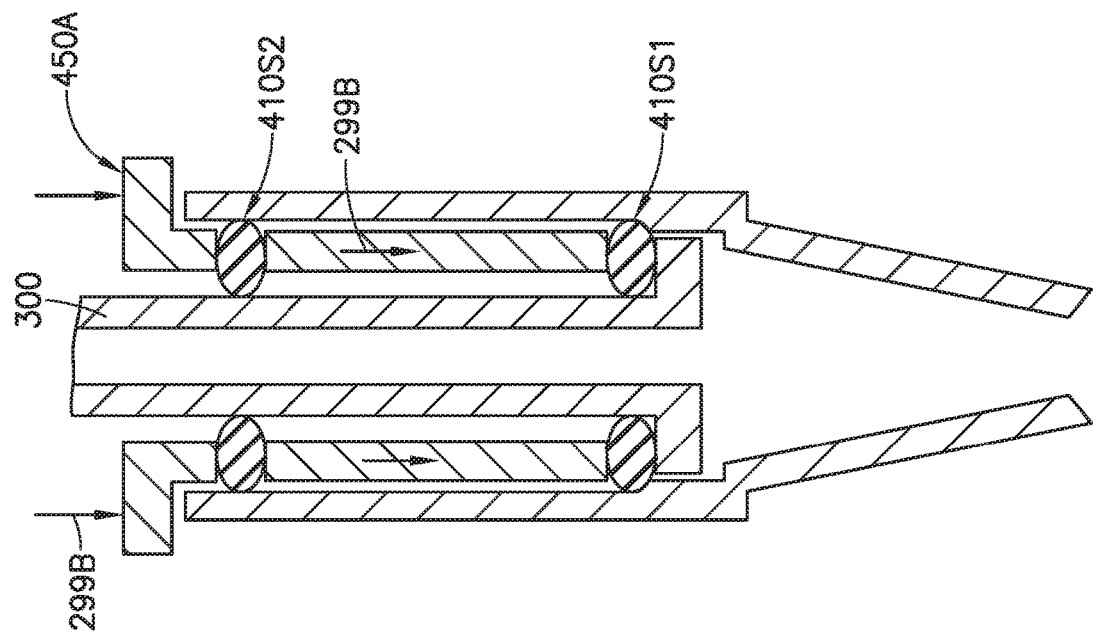
FIGS. 6A and 6B are schematic illustrations of an interfacing between a portion of the auto-pipetting apparatus and a disposable pipetting tip in accordance with aspects of the disclosed embodiment.
Figure 6A:
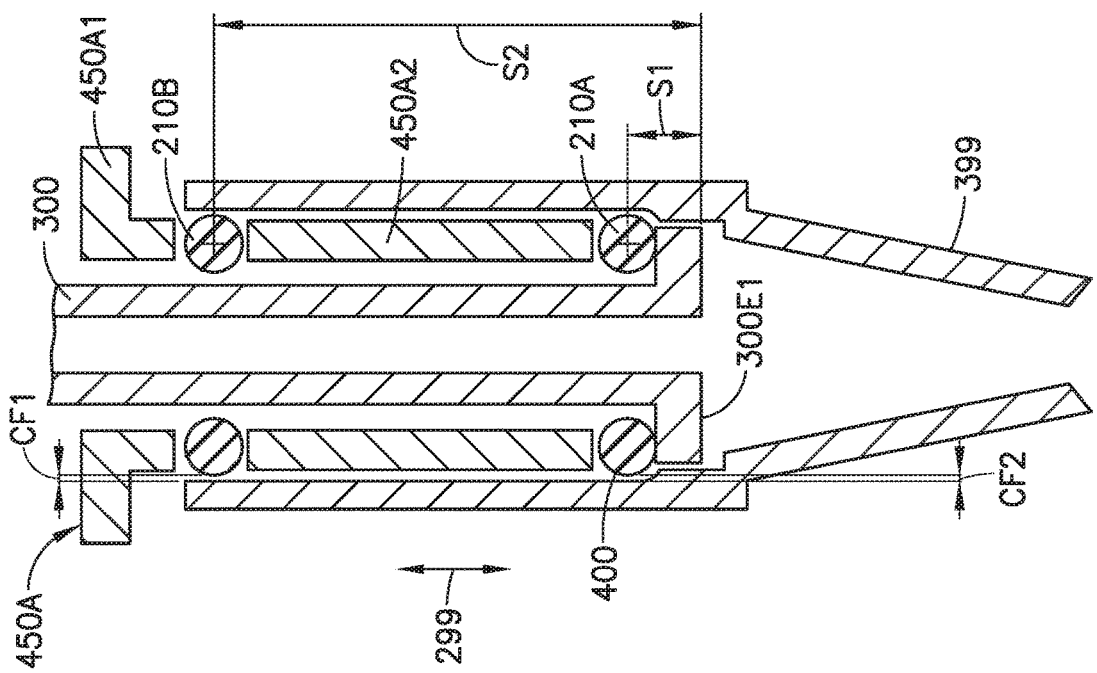

In a manner similar to that described above, one or more pipetting tip mandrels 200-200$n$ are inserted into respective pipetting tips 399 such that the first adjustable seal 310A snubs the insertion of the one or more pipetting tip mandrels 200-200$n$ into the respective pipetting tip 399. The plate 206 (or the frame 205) may be actuated, as described above, to move in direction 299B so that the first portion 450A1 of the seal pair adjustment member 450A, which is coupled to the plate 206 (or the frame 205) as described above, moves in direction 299B to contact the second sealing member 310B. Contact between the first portion 450A1 and the second sealing member 310B causes corresponding contact between the second portion 450A2 and the first sealing member 310A (due to, e.g., the second sealing member 310B pushing the second portion 450A2 in direction 299B). As such, the seal pair adjustment member 450A substantially simultaneously adjusts each of the first-adjustable seal 310A and the second adjustable seal 310B from a corresponding disengaged position (as shown in FIG. 6A) to the engaged position (shown in FIG. 6B). In the disengaged position each of the first adjustable seal 310A and the second adjustable seal 310B forms the respective clearance fit CF1, CF2 between the respective pipetting tip mandrel 200-200$n$ and the respective pipetting tip 399. In the engaged position (shown in FIG. 6B) each of the first adjustable seal 310A and the second adjustable seal 310B contacts the respective pipetting tip 399 mated to the respective pipetting tip mandrel 200-200n effecting the releasable grip that substantially simultaneously grips the respective pipetting tip 399 mated to the respective pipetting tip mandrel 200-200n with both of the first adjustable seal 310A and the second adjustable seal 310B of the seal pair.

As described above, the first adjustable seal 310A and the second adjustable seal 310B may be o-rings having the same or different durometers so that one or more of the substantially continuous circumferential contact seals 410S1, 410S2 (formed on adjustment of the respective adjustable seal 310A, 310B to the engaged position) is established between each of the first-adjustable seal 310A and the second adjustable seal 310B and the pipetting tip 399 without overexpanding/deforming one or more of the first adjustable seal 310A and the second adjustable seal 310B. The first adjustable seal 310A and the second adjustable seal 310B may also be configured to provide a predetermined alignment between each of the pipetting tip mandrels 200-200n and a respective pipetting tip 399.

Figure 8:
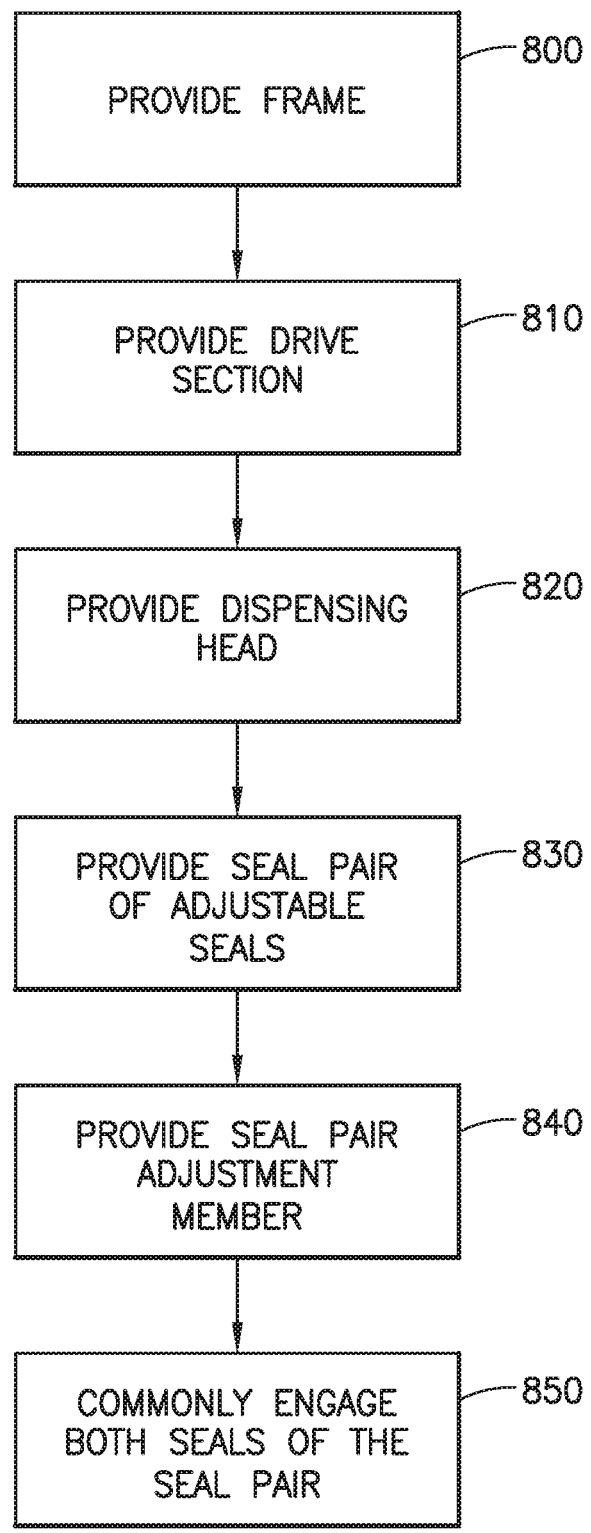
FIG. 8 is a flow diagram in accordance with aspects of the disclosed embodiment.

Referring now to FIGS. 2, 2A, 6A, 6B, and 8 an exemplary operation (which is substantially similar to that described above unless otherwise noted) of the auto-pipetting apparatus 100 will be described. In one aspect, a frame 205 is provided (FIG. 8, Block 800). In one aspect, the frame 205 is part of frame 101. The drive section 110 is provided and mounted to the frame (FIG. 8, Block 810). The dispensing head 130 is provided and connected to the frame (FIG. 8, Block 820). The seal pair of adjustable seals (e.g. including first adjustable seal 310A and second adjustable seal 310B) is provided and mounted to each pipetting tip mandrel of the dispensing head 130 (FIG. 8, Block 830). The seal pair adjustment member 450A is provided and coupled with each pipetting tip mandrel 200-200n and operably connected to the drive section 110, such as the dispensing head drive 110DH, so that, actuation of the drive section 110 effects relative motion between the seal pair adjustment member 450A and each pipetting tip mandrel 200-200n coupled to the seal pair adjustment member 450A (FIG. 8, Block 840).

In one aspect, the one or more pipetting tip mandrels 200-200n are inserted into the respective pipetting tips 399 through motion of the transport 120 (FIG. 1) which may align the one or more pipetting tips mandrels 200-200n with the respective pipetting tip 399 and then move the dispensing head 130 in direction 299B to insert the one or more pipetting tips mandrels 200-200n into the respective pipetting tip 399. Both of the first adjustable seal 310A and the second adjustable seal 310B, of the seal pair, are commonly engaged with the seal pair adjustment member 450A to substantially simultaneously adjust each of the first adjustable seal 310A and the second adjustable seal 310B of the seal pair from the corresponding disengaged position (see FIG. 6A) to the engaged position (see FIG. 6B) as described above.

In a manner substantially similar to that described above, the releasable grip is effected by the substantially continuous circumferential contact seals 410S1, 410S2 formed through contact between both of the first adjustable seal 310A and the second adjustable seal 310B with the pipetting tip 399. Also, in a manner substantially similar to that described above the substantially continuous circumferential contact seals 410S1, 410S2, and releasable grip effected thereby, between the pipetting tip 399 and both of the first adjustable seal 310A and the second adjustable seal 310B of one pipetting tip mandrel 200-200n is effected in substantial unison with both the first adjustable seal 310A and the second adjustable seal 310B of another pipetting tip mandrel 200-200n that grips another respective pipetting tip 399, with but one actuation motion, e.g. of the dispensing head drive 110DH, that is substantially common for each pipetting tip mandrel 200-200n of the one or more pipetting tip mandrels 200-200n. For example, each of the one or more seal adjustment members 450A are operably coupled to a common drive member (e.g. such as the plate 206, screw 284, shuttle 280 and/or connecting levers 210 of the dispensing head drive 110DH) with another seal adjustment member 450 of the one or more seal adjustment members 450 so that each of the one or more seal adjustment members 450 and the other seal adjustment-member 450 are actuated, for movement in direction 299, in unison with a common actuation of the common drive member (e.g. such as the movement of plate 206 in direction 299, the rotation of screw 284 to drive the shuttle 280, the movement of shuttle 280 in direction 297 and/or pivoting of the connecting levers 210 in direction 298).

The pipetting tip 399 is released from the respective pipetting tip mandrel 200-200n in substantially a reverse manner to that described above.

In accordance with one or more aspects of the disclosed embodiment an auto-pipetting apparatus comprises:

a dispensing head with at least one pipetting tip mandrel having an elongated stud body with an insertion end, the at least one pipetting tip mandrel being configured for mating with a pipetting tip into which the elongated stud body of the at least one pipetting tip mandrel is inserted insertion end first;

a first adjustable seal disposed on the elongated stud body and configured so that the first, adjustable seal seals the pipetting tip mated to the at least one pipetting tip mandrel, the first adjustable seal being disposed proximally to the insertion end;

a second adjustable seal disposed on the elongated stud body and configured so that the second adjustable seal seals the pipetting tip mated to the at least one pipetting tip mandrel, the second adjustable seal being disposed distally to the insertion end; and the first adjustable seal defines a snub surface of the at least one pipetting tip mandrel snubbing insertion of the at least one pipetting tip mandrel into the pipetting tip on contact between the pipetting tip and the snub surface of the first adjustable seal, the snub surface being configured so that-snubbing contact adjusts the first adjustable seal and wedges the first adjustable seal against the pipetting tip effecting a substantially continuous circumferential contact seal with radially impinging contact between the pipetting tip and the at least one pipetting tip mandrel;

wherein the second adjustable seal is adjustable between a disengaged position providing a clearance fit between the at least one pipetting tip mandrel and pipetting tip, and an engaged position in which the second adjustable seal contacts the pipetting tip mated to the at least one pipetting tip mandrel effecting a releasable grip and another substantially continuous circumferential contact seal between the pipetting tip and the at least one pipetting tip mandrel around the pipetting tip.

In accordance with one or more aspects of the disclosed embodiment the first adjustable seal forms a clearance fit with the pipetting tip as the at least one pipetting tip mandrel is inserted.

In accordance with one or more aspects of the disclosed embodiment snubbing contact of the snub surface, of the first adjustable seal, with the pipetting tip and adjustment of the first adjustable seal closes the clearance fit between the first adjustable seal and the pipetting tip.

In accordance with one or more aspects of the disclosed embodiment both the first adjustable seal and second adjustable seal form a clearance fit with the pipetting tip as the at least one pipetting tip mandrel is inserted.

In accordance with one or more aspects of the disclosed embodiment the dispensing head is a 96 pipetting tip dispensing head with the clearance fit having a gap ratio of 1.02 to 1.

In accordance with one or more aspects of the disclosed embodiment the dispensing head is a is a 384 pipetting tip dispensing head with the clearance fit having a gap ratio of 1.11 to 1.

In accordance with one or more aspects of the disclosed embodiment the auto-pipetting apparatus further comprises a drive section connected to the dispensing head and at least one seal adjustment member operably connected to the drive section and coupled to the at least, one pipetting tip mandrel, wherein the at least one seal adjustment member interfaces the second adjustable seal and effecting adjustment between the disengaged position and the engaged position.

In accordance with one or more aspects of the disclosed embodiment contact between the pipetting tip and the second adjustable seal in the engaged position forms the substantially continuous circumferential contact seal between the at least, one pipetting tip mandrel and the pipetting tip, where the substantially continuous circumferential contact seal is effected with but one actuation motion substantially common for each pipetting tip mandrel of the at least one pipetting tip mandrel.

In accordance with one or more aspects of the disclosed embodiment the at least one seal adjustment member coupled to the at least one pipetting tip mandrel is operably coupled to a common drive member with another seal adjustment member so that each of the at least one seal adjustment member and the other seal adjustment member are actuated in unison with a common actuation action of the common drive member.

In accordance with one or more aspects of the disclosed embodiment the drive section comprises a motor mounted to a frame of the auto-pipetting apparatus and operably connected to each seal adjustment member, coupled to the at least one pipetting tip mandrel, via a common screw drive.

In accordance with one or more aspects of the disclosed embodiment the motor is operably connected to each seal adjustment member, coupled to the at least one pipetting tip mandrel, through a connecting lever commonly actuating each seal adjustment member so that the second adjustable seal grips the pipetting tip, mated to each of the pipetting tip mandrels of the at least one pipetting tip mandrel, in substantial unison with another second adjustable seal that grips another respective pipetting tip.

In accordance with one or more aspects of the disclosed embodiment an auto-pipetting apparatus comprises:
 a frame;
 a drive section mounted to the frame;
 a dispensing head connected to the frame and having a plurality of pipetting tip mandrels, each pipetting tip mandrel of the plurality of pipetting tip mandrels having an elongated stud body with a dispensing end, each pipetting tip mandrel of the plurality of pipetting tip mandrels being configured for mating with a respective pipetting tip into which the elongated stud body of the pipetting tip mandrel is inserted dispensing end first;
 a seal pair of adjustable seals mounted to each pipetting tip mandrel, the seal pair of adjustable seals is disposed with one seal of the seal pair separated from another seal of the seal pair at different lengths of the elongated stud body from the dispensing end; and
 a seal pair adjustment member, coupled with each pipetting tip mandrel and operably connected to the drive section so that actuation of the drive section effects relative motion between the seal pair adjustment member and each pipetting tip mandrel coupled to the seal pair adjustment member wherein the seal pair adjustment member commonly engages both seals, of the seal pair, substantially simultaneously adjusting each seal of the seal pair from a corresponding disengaged position, in which each seal forms a clearance fit between a respective pipetting tip mandrel and the respective pipetting tip, to an engaged position in which each seal of the seal pair contacts the respective pipetting tip mated to the respective pipetting tip mandrel effecting a releasable grip that substantially simultaneously grips the respective pipetting tip mated to the respective pipetting tip mandrel with both seals of the seal pair.

In accordance with one or more aspects of the disclosed embodiment the substantially simultaneous gripping, of the respective pipetting tip mated to the respective pipetting tip mandrel, with both seals of the seal pair of adjustable seals is effected with but one actuation motion substantially common for each pipetting tip mandrel of the plurality of pipetting tip mandrels mated to the respective pipetting tip.

In accordance with one or more aspects of the disclosed embodiment contact between the respective pipetting tip and one seal of the seal pair of adjustable seals in the engaged position forms a substantially continuous circumferential contact seal between the respective pipetting tip mandrel and the respective pipetting tip mated thereto.

In accordance with one or more aspects of the disclosed embodiment the substantially continuous circumferential contact seal is effected on adjustment of the one seal to the engaged position.

In accordance with one or more aspects of the disclosed embodiment, contact between the respective pipetting tip and both seals of the seal pair of adjustable seals in the engaged position forms more than one substantially continuous circumferential contact seals between the respective pipetting tip mandrel and the respective pipetting tip mated thereto.

In accordance with one or more aspects of the disclosed embodiment the more than one substantially continuous circumferential contact seals are effected on adjustment of each seal of the seal pair of adjustable seals to the engaged position.

In accordance with one or more aspects of the disclosed embodiment the more than one substantially continuous circumferential contact seals are effected substantially simultaneously with but one actuation motion substantially common for each pipetting tip mandrel of the plurality of pipetting tip mandrels.

In accordance with one or more aspects of the disclosed embodiment each seal pair adjustment member coupled the plurality of pipetting tip mandrels is operably coupled to a common drive member with another seal pair adjustment member so that each of the seal pair adjustment member and the other seal pair adjustment member are actuated in unison with a common actuation action of the common drive member.

In accordance with one or more aspects of the disclosed embodiment the drive section comprises a motor mounted to the frame and operably connected to each seal pair adjustment member, coupled to the plurality of pipetting tip mandrels, via a common screw drive.

In accordance with one or more aspects of the disclosed embodiment the motor is operably connected to each seal pair adjustment member, coupled to the plurality of pipetting tip mandrels, through a connecting lever commonly actuating each seal pair adjustment member so that each seal pair of adjustable seals grips the respective pipetting tip, mated to each of the pipetting tip mandrels of the plurality pipetting tip mandrels, in substantial unison with another seal pair of adjustable seals that grips another respective pipetting tip.

In accordance with one or more aspects of the disclosed embodiment one adjustable seal of the seal pair of adjustable seals defines a snub surface of the respective pipetting tip mandrel snubbing insertion of the respective pipetting tip mandrel into the respective pipetting tip.

In accordance with one or more aspects of the disclosed embodiment the dispensing head is a 96 pipetting tip dispensing head with the clearance fit having a gap ratio of 1.02 to 1.

In accordance with one or more aspects of the disclosed embodiment the dispensing head is a is a 384 pipetting tip dispensing head with the clearance fit having a gap ratio of 1.11 to 1.

In accordance with one or more aspects of the disclosed embodiment an auto-pipetting method comprises:

providing a dispensing head with at least one pipetting tip mandrel having an elongated stud body with an insertion end, the at least one pipetting tip mandrel being configured for mating with a pipetting tip into which the elongated stud body of the at least one pipetting tip mandrel is inserted insertion end first;

providing a first adjustable seal disposed on the elongated stud body and configured so that the first adjustable seal seals the pipetting tip mated to the at least, one pipetting tip mandrel, the first adjustable seal being disposed proximally to the insertion end;

providing a second adjustable seal disposed on the elongated stud body and configured so that the second adjustable seal seals the pipetting tip mated to the at least one pipetting tip mandrel, the second adjustable seal being disposed distally to the insertion end;

snubbing insertion of the at least one pipetting tip mandrel into the pipetting tip on contact between the pipetting tip and a snub surface of the at least one pipetting tip mandrel, with the snub surface of the at least one pipetting tip mandrel defined by the first adjustable seal, where snubbing contact of the snub surface adjusts the first adjustable seal and wedges the first adjustable seal against the pipetting tip effecting a substantially continuous circumferential contact seal with radially impinging contact between the pipetting tip and the at least one pipetting tip mandrel; and adjusting the second adjustable seal between a disengaged position providing a clearance fit between the at least one pipetting tip mandrel and pipetting tip, and an engaged position in which the second adjustable seal contacts the pipetting tip mated to the at least one pipetting tip mandrel effecting a releasable grip and another substantially continuous circumferential contact seal between the pipetting tip and the at least one pipetting tip mandrel around the pipetting tip.

In accordance with one or more aspects of the disclosed embodiment the auto-pipetting method further comprises forming, with the first adjustable seal, a clearance fit with the pipetting tip as the at least one pipetting tip mandrel is inserted.

In accordance with one or more aspects of the disclosed embodiment the snubbing contact of the snub surface, of the first adjustable seal, with the pipetting tip and adjustment of the first adjustable seal closes the clearance fit between the first adjustable seal and the pipetting tip.

In accordance with one or more aspects of the disclosed embodiment the auto-pipetting method further comprises forming, with both the first adjustable seal and second adjustable seal, a clearance fit with the pipetting tip as the at least one pipetting tip mandrel is inserted.

In accordance with one or more aspects of the disclosed embodiment the dispensing head is a 96 pipetting tip dispensing head with the clearance fit having a gap ratio of 1.02 to 1.

In accordance with one or more aspects of the disclosed embodiment the dispensing head is a is a 384 pipetting tip dispensing head with the clearance fit having a gap ratio of 1.11 to 1.

In accordance with one or more aspects of the disclosed embodiment the auto-pipetting method further comprises providing a drive section connected to the dispensing head and at least one seal adjustment member operably connected to the drive section and coupled to the at least, one pipetting tip mandrel, wherein the at least one seal adjustment member interfaces the second adjustable seal and effecting adjustment between the disengaged position and the engaged position.

In accordance with one or more aspects of the disclosed embodiment the auto-pipetting method further comprises forming, with contact between the pipetting tip and the second adjustable seal in the engaged position, a substantially continuous circumferential contact, seal between the at least one pipetting tip mandrel and the pipetting tip, where the substantially continuous circumferential contact seal is effected with but one actuation motion substantially common for each pipetting tip mandrel of the plurality of pipetting tip mandrels.

In accordance with one or more aspects of the disclosed embodiment the at least one seal adjustment member coupled to the at least one pipetting tip mandrel is operably coupled to a common drive member with another seal adjustment member so that each of the at least one seal adjustment member and the other seal adjustment member are actuated in unison with a common actuation action of the common drive member.

In accordance with one or more aspects of the disclosed embodiment the auto-pipetting method of claim 31, further comprises providing the drive section with a motor mounted to a frame of an auto-pipetting apparatus and operably connected to each seal adjustment member, coupled to the at least one pipetting tip mandrel, via a common screw drive.

In accordance with one or more aspects of the disclosed embodiment the auto-pipetting method further comprises operably connecting the motor to each seal adjustment member, coupled to the at least one pipetting tip mandrel, through a connecting lever commonly actuating each seal adjustment member so that the second adjustable seal grips the pipetting tip, mated to each of the pipetting tip mandrels of the at least one pipetting tip mandrel, in substantial unison with another second adjustable seal that grips another respective pipetting tip.

In accordance with one or more aspects of the disclosed embodiment an auto-pipetting method comprises:

providing a frame;

providing a drive section mounted to the frame;

providing a dispensing head connected to the frame and having a plurality of pipetting tip mandrels, each pipetting tip mandrel of the plurality of pipetting tip mandrels having an elongated stud body with a dispensing end, each pipetting tip mandrel of the plurality of pipetting tip mandrels being configured for mating with a respective pipetting tip into which the elongated stud body of the pipetting tip mandrel is inserted dispensing end first;

providing a seal pair of adjustable seals mounted to each pipetting tip mandrel, the seal pair of adjustable seals is disposed with one seal of the seal pair of adjustable seals separated from another seal of the seal pair of adjustable seals at different lengths of the elongated stud body from the dispensing end;

providing a seal pair adjustment member, coupled with each pipetting tip mandrel and operably connected to the drive section so that actuation of the drive section effects relative motion between the seal pair adjustment member and each pipetting tip mandrel coupled to the seal pair adjustment member; and commonly engaging both seals, of the seal pair of adjustable seals, with the seal pair adjustment member to substantially simultaneously adjust each seal of the seal pair of adjustable seals from a corresponding disengaged position, in which each seal of the seal pair of adjustable seals forms a clearance fit between a respective pipetting tip mandrel and the respective pipetting tip, to an engaged position in which each seal of the seal pair of adjustable seals contacts the respective pipetting tip mated to the respective pipetting tip mandrel effecting a releasable grip that substantially simultaneously grips the respective pipetting tip mated to the respective pipetting tip mandrel with both seals of the seal pair of adjustable seals.

In accordance with one or more aspects of the disclosed embodiment the substantially simultaneous gripping, of the respective pipetting tip mated to the respective pipetting tip mandrel, with both seals of the seal pair of adjustable seals is effected with but one actuation motion substantially common for each pipetting tip mandrel of the plurality of pipetting tip mandrels mated to the respective pipetting tip.

In accordance with one or more aspects of the disclosed embodiment the auto-pipetting method further comprises forming a substantially continuous circumferential contact seal between the respective pipetting tip mandrel and the respective pipetting tip mated thereto with contact between the respective pipetting tip and one seal of the seal pair of adjustable seals in the engaged position.

In accordance with one or more aspects of the disclosed embodiment the auto-pipetting method of further comprises effecting the substantially continuous circumferential contact seal on adjustment of the one seal to the engaged position.

In accordance with one or more aspects of the disclosed embodiment the auto-pipetting method further comprises forming more than one substantially continuous circumferential contact seals between the respective pipetting tip mandrel and the respective pipetting tip mated thereto with contact between the respective pipetting tip and both seals of the seal pair in the engaged position.

In accordance with one or more aspects of the disclosed embodiment the auto-pipetting method further comprises effecting the more than one substantially continuous circumferential contact seals on adjustment of each seal of the seal pair of adjustable seals to the engaged position.

In accordance with one or more aspects of the disclosed embodiment the auto-pipetting method further comprises effecting the more than one substantially continuous circumferential contact seals substantially simultaneously with but one actuation motion substantially common for each pipetting tip mandrel of the plurality of pipetting tip mandrels.

In accordance with one or more aspects of the disclosed embodiment each seal pair adjustment member coupled the plurality of pipetting tip mandrels is operably coupled to a common drive member with another seal pair adjustment member so that each of the seal pair adjustment member and the other seal pair adjustment member are actuated in unison with a common actuation action of the common drive member.

In accordance with one or more aspects of the disclosed embodiment the auto-pipetting method further comprises providing the drive section with a motor mounted to the frame and operably connected to each seal pair adjustment member, coupled to the plurality of pipetting tip mandrels, via a common screw drive.

In accordance with one or more aspects of the disclosed embodiment the auto-pipetting method further comprises operably connecting the motor to each seal pair adjustment-member, coupled to the plurality of pipetting tip mandrels, through a connecting lever commonly actuating each seal pair adjustment member so that each seal pair of adjustable seals grips the respective pipetting tip, mated to each of the pipetting tip mandrels of the plurality pipetting tip mandrels, in substantial unison with another seal pair of adjustable seals that grips another respective pipetting tip.

In accordance with one or more aspects of the disclosed embodiment the auto-pipetting method further comprises snubbing insertion of the respective pipetting tip mandrel into the respective pipetting tip with a snub surface of the respective pipetting tip mandrel defined by one adjustable seal of the seal pair of adjustable seals.

In accordance with one or more aspects of the disclosed embodiment the dispensing head is a 96 pipetting tip dispensing head with the clearance fit having a gap ratio of 1.02 to 1.

In accordance with one or more aspects of the disclosed embodiment the dispensing head is a is a 384 pipetting tip dispensing head with the clearance fit having a gap ratio of 1.11 to 1.

In accordance with one or more aspects of the disclosed embodiment a pipetting tip for an auto-pipetting apparatus is provided. The pipetting tip comprises:

a pipette tip collar having an insertion end configured to interface with and automatically engage a pipetting tip mandrel of the auto-pipetting apparatus;

a dispensing tip extending from the pipette tip collar opposite the insertion end;

a first seal detent surface disposed on a surface of the pipette tip collar, the first seal detent surface being disposed so as to engage and snub insertion of the pipetting tip mandrel so that snub contact between the first seal detent surface wedges a first sealing part of the pipetting tip mandrel against the first seal detent surface effecting a substantially continuous circumferential contact seal with radially impinging contact between the first seal detent surface and the pipetting tip mandrel; and a second seal detent surface disposed on the surface of the pipette tip collar so that the second seal detent surface is longitudinally spaced from the first seal detent surface, the second seal detent surface being configured to conform with and engage a second sealing part of the pipetting tip mandrel effecting a releasable grip and another substantially continuous circumferential contact seal between second seal detent surface and the pipetting tip mandrel.

In accordance with one or more aspects of the disclosed embodiment the first seal detent surface forms a clearance fit with the pipetting tip mandrel as the pipetting tip mandrel is inserted into the pipette tip collar.

In accordance with one or more aspects of the disclosed embodiment both the first seal detent surface and the second seal detent surface form a clearance fit with the pipetting tip mandrel as the pipetting tip mandrel is inserted into the pipette tip collar.

In accordance with one or more aspects of the disclosed embodiment an auto-pipetting apparatus is provided. The auto-pipetting apparatus comprising:

a dispensing head including at least one pipetting tip mandrel having an elongated stud body with a mandrel insertion end, a first adjustable seal disposed on the elongated stud body proximally to the mandrel insertion end, and a second adjustable seal disposed on the elongated stud body distally to the mandrel insertion end;

at least one pipetting tip including a pipette tip collar having an tip insertion end configured for mating with the at least one pipetting tip mandrel where the elongated stud body is inserted into the tip insertion end of the pipette tip collar mandrel insertion end first, a first seal detent surface disposed on a surface of the pipette tip collar, the first seal detent surface being configured to engage the first, adjustable seal so that the first adjustable seal seals the pipetting tip mated to the at least-one pipetting tip mandrel, and a second seal detent surface disposed on the surface of the pipette tip collar so that the second seal detent surface is longitudinally spaced from the first seal detent surface, the second seal detent surface being configured to engage the second adjustable seal so that the second adjustable seal seals the pipetting tip mated to the at least one pipetting tip mandrel; and wherein the first adjustable seal defines a snub surface of the at least one pipetting tip mandrel snubbing insertion of the at least one pipetting tip mandrel into the pipette tip collar on contact between the first seal detent surface and the snub surface of the first adjustable seal, the snub surface being configured so that snubbing contact adjusts the first adjustable seal and wedges the first, adjustable seal against the first seal detent surface effecting a substantially continuous circumferential contact seal with radially impinging contact between the first seal detent surface and the at least-one pipetting tip mandrel, and wherein the second adjustable seal is adjustable between a disengaged position providing a clearance fit between the at least one pipetting tip mandrel and the pipette tip collar, and an engaged position in which the second adjustable seal contacts the pipette tip collar mated to the at least one pipetting tip mandrel effecting a releasable grip and another substantially continuous circumferential contact seal between the pipette tip collar and the at least one pipetting tip mandrel around the pipette tip collar.

In accordance with one or more aspects of the disclosed embodiment the dispensing head is a 96 pipetting tip dispensing head with the clearance fit having a gap ratio of 1.02 to 1.

In accordance with one or more aspects of the disclosed embodiment the dispensing head is a is a 384 pipetting tip dispensing head with the clearance fit having a gap ratio of 1.11 to 1.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An auto-pipetting apparatus comprising:
a dispensing head with at least one pipetting tip mandrel having an elongated stud body with an insertion end, the at least one pipetting tip mandrel being configured for mating with a pipetting tip into which the elongated stud body of the at least one pipetting tip mandrel is inserted insertion end first;
a first adjustable seal disposed on the elongated stud body and configured so that the first adjustable seal seals the pipetting tip mated to the at least one pipetting tip mandrel, the first adjustable seal being disposed proximally to the insertion end;
a second adjustable seal disposed on the elongated stud body and configured so that the second adjustable seal seals the pipetting tip mated to the at least one pipetting tip mandrel, the second adjustable seal being disposed distally to the insertion end; and
the first adjustable seal defines an insertion snubber with a snub surface of the at least one pipetting tip mandrel snubbing insertion of the at least one pipetting tip mandrel into the pipetting tip on contact between the pipetting tip and the snub surface of the first adjustable seal, the snub surface being configured so that snubbing contact adjusts the first adjustable seal and wedges the first adjustable seal against the pipetting tip effecting a substantially continuous circumferential contact seal with radially impinging contact between the pipetting tip and the at least one pipetting tip mandrel;
wherein the second adjustable seal is adjustable between a disengaged position providing a clearance fit between the at least one pipetting tip mandrel and pipetting tip, and an engaged position in which the second adjustable seal contacts the pipetting tip mated to the at least one pipetting tip mandrel effecting a releasable grip and another substantially continuous circumferential contact seal between the pipetting tip and the at least one pipetting tip mandrel around the pipetting tip.

2. The auto-pipetting apparatus of claim 1, wherein the first adjustable seal forms a clearance fit with the pipetting tip as the at least one pipetting tip mandrel is inserted.

3. The auto-pipetting apparatus of claim 2, wherein snubbing contact of the snub surface, of the first adjustable seal, with the pipetting tip and adjustment of the first adjustable seal closes the clearance fit between the first adjustable seal and the pipetting tip.

4. The auto-pipetting apparatus of claim 1, wherein both the first adjustable seal and second adjustable seal form a clearance fit with the pipetting tip as the at least one pipetting tip mandrel is inserted.

5. The auto-pipetting apparatus of claim 1, wherein the dispensing head is a 96 pipetting tip dispensing head with the clearance fit having a gap ratio of 1.02 to 1.

6. The auto-pipetting apparatus of claim 1, wherein the dispensing head is a is a 384 pipetting tip dispensing head with the clearance fit having a gap ratio of 1.11 to 1.

7. The auto-pipetting apparatus of claim 1, further comprising a drive section connected to the dispensing head and at least one seal adjustment member operably connected to the drive section and coupled to the at least one pipetting tip mandrel, wherein the at least one seal adjustment member interfaces the second adjustable seal and effects adjustment between the disengaged position and the engaged position.

8. The auto-pipetting apparatus of claim 7, wherein contact between the pipetting tip and the second adjustable seal in the engaged position forms the another substantially continuous circumferential contact seal between the at least one pipetting tip mandrel and the pipetting tip, and where the another substantially continuous circumferential contact seal is effected with but one actuation motion substantially common for each pipetting tip mandrel of the at least one pipetting tip mandrel.

9. The auto-pipetting apparatus of claim 7, wherein the at least one seal adjustment member coupled to the at least one pipetting tip mandrel is operably coupled to a common drive member with another seal adjustment member so that each of the at least one seal adjustment member and the other seal adjustment member are actuated in unison with a common actuation action of the common drive member.

10. The auto-pipetting apparatus of claim 7, wherein the drive section comprises a motor mounted to a frame of the auto-pipetting apparatus and the motor is operably connected to each of the at least one seal adjustment member via a common screw drive.

11. The auto-pipetting apparatus of claim 10, wherein the motor is operably connected to each of the at least one seal adjustment member, coupled to the at least one pipetting tip mandrel, through a connecting lever commonly actuating each of the at least one seal adjustment member so that the second adjustable seal grips the pipetting tip, mated to each of the pipetting tip mandrels of the at least one pipetting tip mandrel, in substantial unison with another second adjustable seal that grips another respective pipetting tip.

12. An auto-pipetting method comprising:
providing a dispensing head with at least one pipetting tip mandrel having an elongated stud body with an insertion end, the at least one pipetting tip mandrel being configured for mating with a pipetting tip into which the elongated stud body of the at least one pipetting tip mandrel is inserted insertion end first;
providing a first adjustable seal disposed on the elongated stud body and configured so that the first adjustable seal seals the pipetting tip mated to the at least one pipetting tip mandrel, the first adjustable seal being disposed proximally to the insertion end;
providing a second adjustable seal disposed on the elongated stud body and configured so that the second adjustable seal seals the pipetting tip mated to the at least one pipetting tip mandrel, the second adjustable seal being disposed distally to the insertion end;
snubbing insertion of the at least one pipetting tip mandrel into the pipetting tip on contact between the pipetting tip and an insertion snubber with a snub surface of the at least one pipetting tip mandrel, with the insertion snubber with the snub surface of the at least one pipetting tip mandrel defined by the first adjustable seal, where snubbing contact of the snub surface adjusts the first adjustable seal and wedges the first adjustable seal against the pipetting tip effecting a substantially continuous circumferential contact seal with radially impinging contact between the pipetting tip and the at least one pipetting tip mandrel; and
adjusting the second adjustable seal between a disengaged position providing a clearance fit between the at least one pipetting tip mandrel and pipetting tip, and an engaged position in which the second adjustable seal contacts the pipetting tip mated to the at least one pipetting tip mandrel effecting a releasable grip and another substantially continuous circumferential contact seal between the pipetting tip and the at least one pipetting tip mandrel around the pipetting tip.

13. The auto-pipetting method of claim 12, further comprising forming, with the first adjustable seal, a clearance fit with the pipetting tip as the at least one pipetting tip mandrel is inserted.

14. The auto-pipetting method of claim 13, wherein the snubbing contact of the snub surface, of the first adjustable seal, with the pipetting tip and adjustment of the first adjustable seal closes the clearance fit between the first adjustable seal and the pipetting tip.

15. The auto-pipetting method of claim 12, further comprising forming, with both the first adjustable seal and second adjustable seal, a clearance fit with the pipetting tip as the at least one pipetting tip mandrel is inserted.

16. The auto-pipetting method of claim 12, wherein the dispensing head is a 96 pipetting tip dispensing head with the clearance fit having a gap ratio of 1.02 to 1.

17. The auto-pipetting method of claim 12, wherein the dispensing head is a 384 pipetting tip dispensing head with the clearance fit having a gap ratio of 1.11 to 1.

18. The auto-pipetting method of claim 12, further comprising providing a drive section connected to the dispensing head and at least one seal adjustment member operably connected to the drive section and coupled to the at least one pipetting tip mandrel, wherein the at least one seal adjustment member interfaces the second adjustable seal and effecting adjustment between the disengaged position and the engaged position.

19. The auto-pipetting method of claim 18, further comprising forming, with contact between the pipetting tip and the second adjustable seal in the engaged position, the another substantially continuous circumferential contact seal between the at least one pipetting tip mandrel and the pipetting tip, where the another substantially continuous circumferential contact seal is effected with but one actuation motion substantially common for each pipetting tip mandrel of the plurality of pipetting tip mandrels.

20. The auto-pipetting method of claim 18, wherein the at least one seal adjustment member coupled to the at least one pipetting tip mandrel is operably coupled to a common drive member with another seal adjustment member so that each of the at least one seal adjustment member and the other seal adjustment member are actuated in unison with a common actuation action of the common drive member.

21. The auto-pipetting method of claim 18, further comprising providing the drive section with a motor mounted to a frame of an auto-pipetting apparatus and where the motor is operably connected to each of the at least one seal adjustment member via a common screw drive.

22. The auto-pipetting method of claim 21, further comprising operably connecting the motor to each of the at least one seal adjustment member, coupled to the at least one pipetting tip mandrel, through a connecting lever commonly actuating each of the at least one seal adjustment member so that the second adjustable seal grips the pipetting tip, mated to each of the pipetting tip mandrels of the at least one pipetting tip mandrel, in substantial unison with another second adjustable seal that grips another respective pipetting tip.

* * * * *